(12) United States Patent
Hayashida et al.

(10) Patent No.: US 6,425,822 B1
(45) Date of Patent: Jul. 30, 2002

(54) MUSIC GAME MACHINE WITH SELECTABLE CONTROLLER INPUTS

(75) Inventors: Koichi Hayashida; Yasushi Kawasaki, both of Yokohama (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/447,895

(22) Filed: Nov. 23, 1999

(30) Foreign Application Priority Data

Nov. 26, 1998 (JP) .......................................... 10-354013

(51) Int. Cl.$^7$ ................................................ A63F 13/00
(52) U.S. Cl. ................................. 463/7; 463/43; 463/36
(58) Field of Search ........................... 463/1, 7, 36–38, 463/43; 434/307 A, 308

(56) References Cited

U.S. PATENT DOCUMENTS

| | | | | |
|---|---|---|---|---|
| 4,422,365 A | * | 12/1983 | Iwaki | 84/478 |
| 5,270,475 A | | 12/1993 | Weiss et al. | |
| 5,393,070 A | * | 2/1995 | Best | 463/37 |
| 5,469,740 A | | 11/1995 | French et al. | |
| 5,584,779 A | | 12/1996 | Knecht et al. | |
| 5,759,100 A | * | 6/1998 | Nakanishi | 463/37 |
| 5,769,719 A | * | 6/1998 | Hsu | 463/37 |
| 6,008,783 A | * | 12/1999 | Kitagawa | 345/39 |
| 6,031,174 A | * | 2/2000 | Takabayashi | 84/609 |
| 6,149,523 A | * | 11/2000 | Yamada et al. | 463/31 |
| 6,319,121 B1 | * | 11/2001 | Yamada et al. | 463/8 |

FOREIGN PATENT DOCUMENTS

| | | |
|---|---|---|
| EP | 0823270 | 2/1998 |
| EP | 0903169 | 3/1999 |
| EP | 0974954 | 1/2000 |
| JP | 168074 | 5/1989 |

* cited by examiner

*Primary Examiner*—Valencia Martin-Wallace
*Assistant Examiner*—John M Hotaling, II
(74) *Attorney, Agent, or Firm*—Jordan and Hamburg LLP

(57) ABSTRACT

The invention provides a game system, comprising a display device for displaying a game picture, an input unit having a plurality of operation members to be operated by a player for outputting a signal corresponding to an operation state of the operation members, a storage device for storing operation timing data which specifies operation timing in a game relating to a predetermined number of operated sections allocated to at least some of said plurality of operation members, and a game control unit for checking the output signal from the input unit and the data recorded in the storage device, and simultaneously executing the game according to a predetermined procedure on a screen of the display device.

In the game system, the game control unit comprises operation instructing device for displaying an image for instructing each of the predetermined number of operated sections to be operated at timing defined by the operation timing data on the screen of the display device based on the operation timing data during the game, a mode selecting device for selecting a first mode for setting a number of said operated sections used in the game to said predetermined number, or a second mode for limiting the number of the operated sections to a limited number smaller than the predetermined number according to an instruction from the player, an operation instruction limiting device for changing the instruction image displayed through the operation instructing device so as to instruct the player to operate only said limited number of operated sections, during in the second mode, an evaluating device for evaluating the operation by the player on the input unit performed in response to the instruction from the operation instructing device based on the operation timing data, and an evaluation informing device for informing the player of information relating to the evaluated result by the evaluating device.

17 Claims, 25 Drawing Sheets

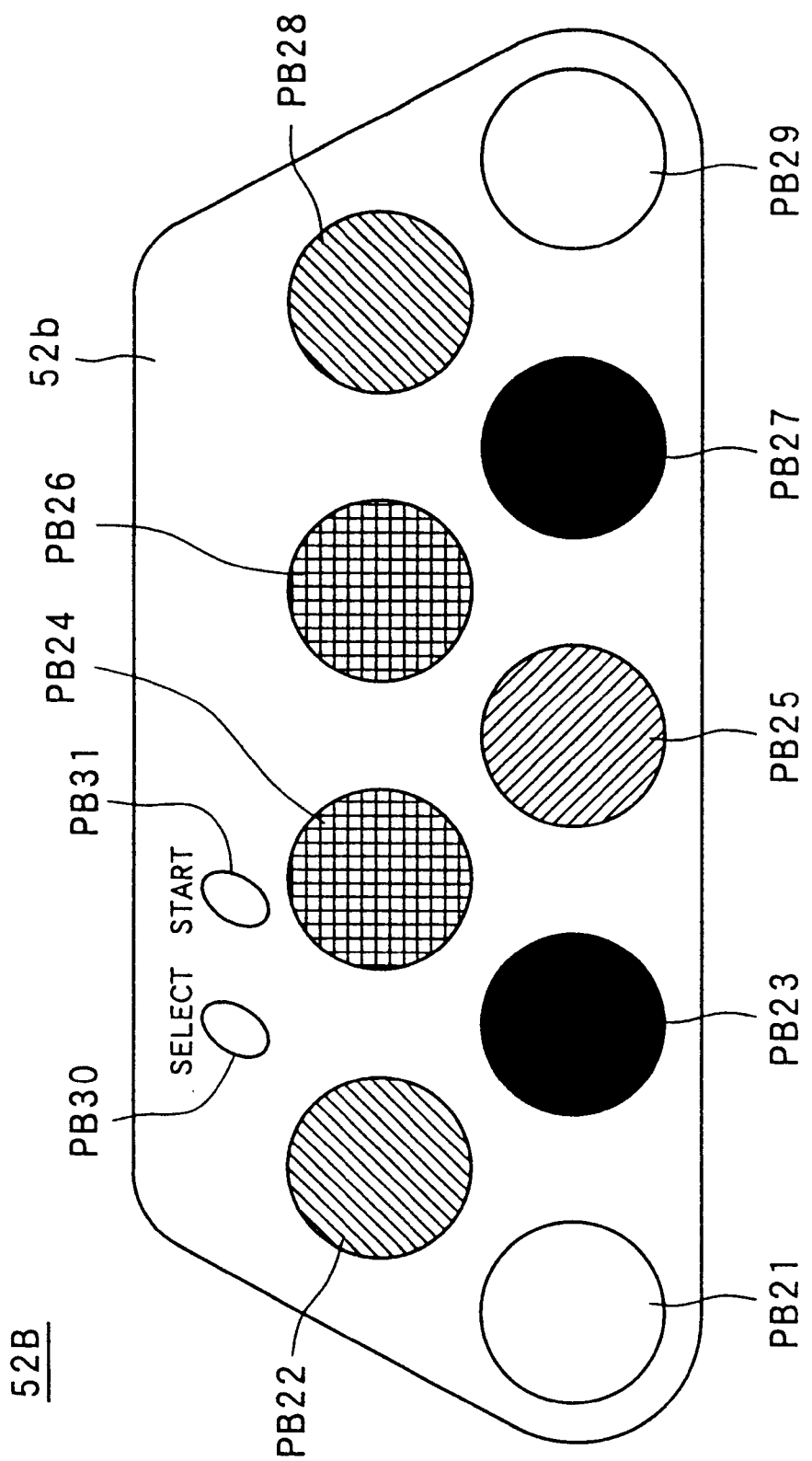

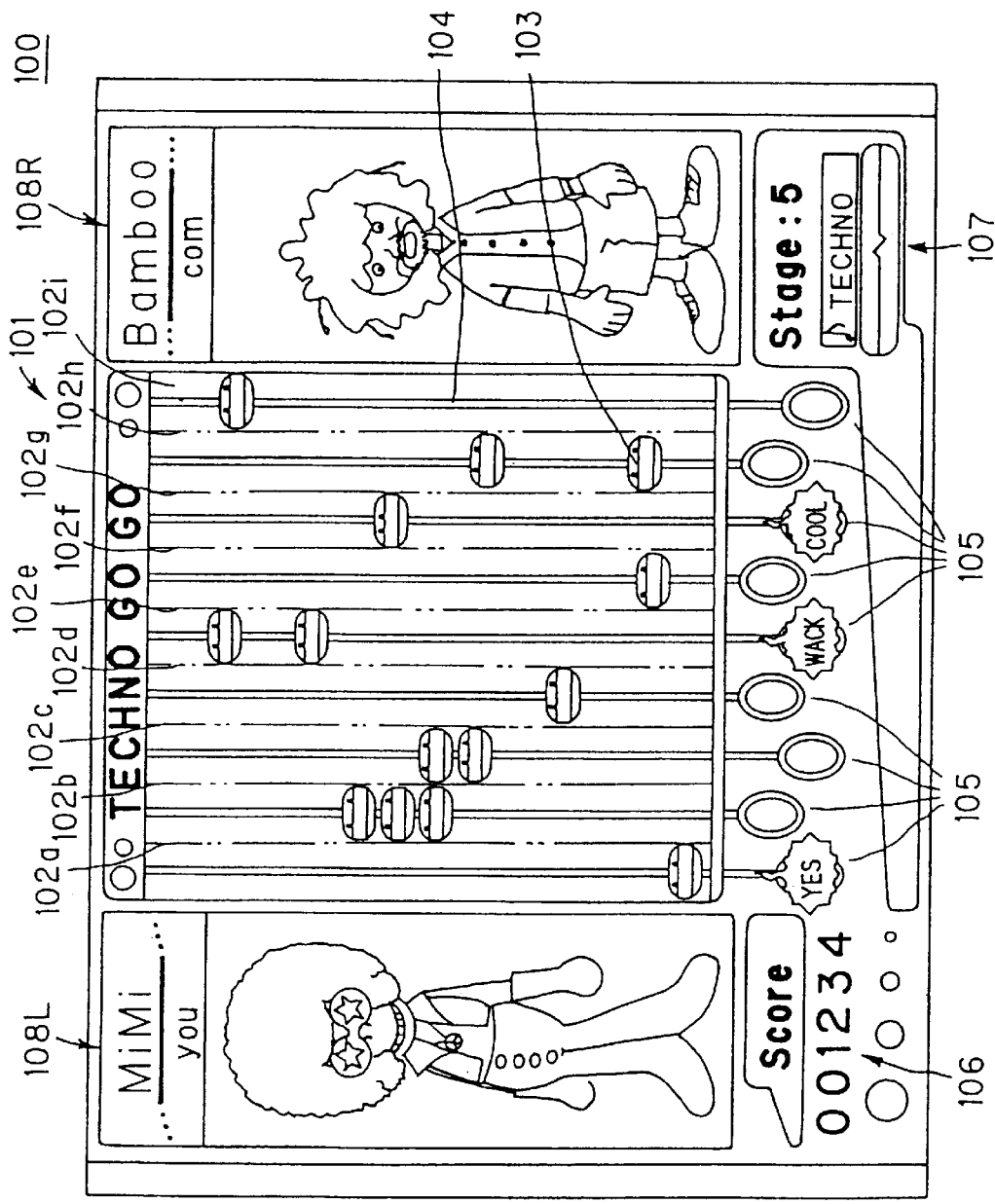

FIG. 5

| OPERATION BUTTON | GENERAL-PURPOSE CONTROLLER (1P) | GENERAL-PURPOSE CONTROLLER (1P & 2P) | | DEDICATED CONTROLLER |
|---|---|---|---|---|
| | | 1P | 2P | |
| A | PB10 | PB3 | | PB21 |
| B | PB9 | PB1 | | PB22 |
| C | PB3 | PB4,7 | | PB23 |
| D | PB1,2 | PB5 | | PB24 |
| E | PB4,7 | PB8 | | PB25 |
| F | PB5,6 | | PB3 | PB26 |
| G | PB8 | | PB1 | PB27 |
| H | PB11 | | PB4,7 | PB28 |
| | | | PB5 | |
| I | PB12 | | PB8 | PB29 |

MUSIC X DATA

PLAYING DATA

|  | PHRASE 1 | PHRASE 2 | PHRASE 3 |
|---|---|---|---|
| OPERATION BUTTON A | SOUND EFFECT 1 | SOUND EFFECT 11 | SOUND EFFECT 1 |
| OPERATION BUTTON B | SOUND EFFECT 2 | SOUND EFFECT 12 | SOUND EFFECT 2 |
| OPERATION BUTTON C | SOUND EFFECT 3 | SOUND EFFECT 13 | SOUND EFFECT 3 |
| OPERATION BUTTON D | SOUND EFFECT 4 | SOUND EFFECT 14 | SOUND EFFECT 4 |
| ⋮ | ⋮ | ⋮ | ⋮ |
| OPERATION BUTTON I | SOUND EFFECT 9 | SOUND EFFECT 19 | SOUND EFFECT 16 |

MUSIC GAME MACHINE WITH SELECTABLE CONTROLLER INPUTS

BACKGROUND OF THE INVENTION

1. Field of the Invention

The present invention relates to a game system which is constituted in order to enjoy an operation according to music and the like.

2. Description of Related Art

In such a kind of game system, at least one of plural operation members provided in the game input device is allocated as a section to be operated used in the game, and operation timing during the game relating to the section to be operated is previously set according to the predetermined music. When the game is started, an instruction is given to the player through the game screen so that each section to be operated is operated at the set timing in cooperation with music. When the player operates the operation member in response to the instruction, accuracy of the operation is judged and the play result is determined based on the judged result, and the player is notified of the play result.

In the above game system, a number of sections to be operated has relative relation to degree of difficulty of the game, and thus it is desirable to increase a number of sections to be operated and set the degree of difficulty higher in order to enjoy the game for a long period. On the contrary, it is difficult for a player who is not used to the game to accurately operate a lot of sections to be operated while checking instruction on the screen, and thus when a number of sections to be operated is large, the player would loose his or her interest in the game. Moreover, when a number of sections to be operated is large, it becomes difficult to grasp a corresponding relationship between the instructions on the screen and operation members on the input unit. This possibly confuses the player who is not used to the game.

SUMMARY OF THE INVENTION

The present invention has been achieved with such points in view. Therefore, it is an object of the present invention to provide a game system in which operational environment which is suitable for a level of a player can be set when a game is executed in such a manner that operation members of an input unit are operated according to a rhythm or the like of music.

There will be described below the present invention. Here, in order to make the understanding of the invention easy, reference numerals of attached drawings which are put in parentheses are given, but the present invention is not limited to embodiments of the drawings.

The invention according to a first aspect provides a game system, characterized by comprising: a display device (20) for displaying a game screen; an input unit (52A, 52B) having a plurality of operation members (PB1 through PB14, PB21 through PB31) to be operated by a player for outputting a signal corresponding to an operation state of the operation members; a storage device (44, 13) for storing operation timing data which specifies operation timing in a game relating to a predetermined number of operated sections allocated to at least some of a plurality of the operation members; and a game control unit (11) for checking the output signal from the input unit and the data recorded in the storage means, and simultaneously executing the game according to a predetermined procedure on a screen of the display device, wherein the game control unit comprises: an operation instructing device for displaying on the screen of the displaying device during the game, an instruction image (101) for instructing the player to operate each of the predetermined number of operated sections at timing defined by the operation timing data, a mode selecting device for selecting a first mode for setting a number of said operated sections used in the game to said predetermined number, or a second mode for limiting the number of the operated sections to a limited number smaller than the predetermined number according to an instruction from the player, an operation instruction limiting device for changing the instruction image displayed through the operation instructing device so as to instruct the player to operate only said limited number of operated sections, during in the second mode, an evaluating device for evaluating the operation by the player on said input unit performed in response to the instruction from said operation instructing device based on the operation timing data, and an evaluation informing device for informing the player of information relating to the evaluated result by said evaluating device. According to the first aspect, when the second mode is selected to execute the game, a number of the operated sections which are instructed to be operated by the player through the screen of the display device is decreased compared with the case where the first mode is selected to execute the game. Therefore, difficulty of the second mode can be relatively lowered with respect to the first mode, and it is not necessary for a player who is not used to the game to lower difficulty of the first mode. As a result, operation environment which is suitable for various levels of players can be provided.

The invention according to a second aspect provides the game system depending from the first aspect characterized in that: the operation instructing device displays a gauge (101) which is dividable into parallel tracks (102a through 102i) corresponding to the predetermined number of operated sections and has indexes (103) for showing the operation timing of the operated sections correspondingly to each of the tracks, and gradually changes display positions of the indexes along the tracks according to the proceeding of the game so that when the operation timing of the operated sections corresponding to the tracks comes, the indexes reach predetermined positions of the gauge; and the operation instruction limiting device provides an image effect for making the player realize that the operations of the operated sections corresponding to some of the tracks (for example, 102a, 102b, 102h, and 102i) of the parallel tracks are not required. Therefore, all the tracks are used for the instruction of the operations in the first mode, and some of the tracks are not used for the instruction of the operations in the second mode. For this reason, a number of the tracks to which the player should pay attention is reduced in the second mode, and as a result the difficulty of the game is lowered.

The invention according to a third aspect provides the game system depending from the second aspect characterized in that the image effect is to lower lightness of some of the tracks. Therefore, it can be clear to the player that the player does not have to pay attention to some of the tracks.

The invention according to a fourth aspect provides the game system depending from the third aspect characterized in that the some of the tracks are positioned in ends of the gauge in a direction in which the tracks are arranged. Therefore, in the case where the game is executed in the second mode, the player pays attention only to the tracks arranged on the center of the plural tracks, and thus an instruction of the operations can be obtained more easily.

The invention according to a fifth aspect provides the game system depending from the first aspect characterized by further comprising a sound output device (30) for outputting a predetermined sound, wherein the storage device (44, 13) stores music data and sound effect data for outputting predetermined music and sound effects corresponding to the operations of the operated sections from the sound output device, the game control unit (11) comprises a music reproduction instructing device for outputting the music based on the music data from the sound output device during the game, a sound effect automatic output instructing device for outputting a sound effect according to the operation from the sound output device based on the sound effect data when the game is executed in the second mode, where an indication is made by the operation indication device in the first mode and the operated sections of which operations are not indicated are regarded as being operated with a timing specified by the operation timing data in the second mode.

According to the fifth aspect, a music is reproduced according to the proceedings of the game, and when the input unit is operated according to an instruction given via the display unit, a sound effect is superimposed on the music according to the operation. Therefore, a sense of executing the game rhythmically according to the music is given to the player, and thus the pleasure of the game can be increased. Moreover, the operated sections where an instruction of the operation is omitted are regarded as being operated at predetermined operation timing in the second mode, and a sound effect corresponding to the operation is automatically superimposed. As a result, the pleasure similar to the first mode can be given to the player.

The invention according to a sixth aspect provides the game system depending from the first aspect characterized in that the mode selecting device comprises a mode confirming device for after a predetermined initializing operation is performed on the game system, inquiring of the player as to which of the first or second mode is selected before the game is first executed, and one of the modes is selected based on an instruction of the player in response to the inquiry via the mode confirming device.

According to the sixth aspect, after the game system is initialized, the mode confirming means inquires of the player as to which of the first mode and second mode is selected before the game is first executed. Therefore, an opportunity to select a mode which is suitable to a player is given securely to the player.

The invention according to a seventh aspect provides the game system depending from the sixth aspect characterized in that: a plurality of the input units (52A, 52B) can be connected with the game control unit (11), and the mode selecting device comprises a confirmation control device for judging as to whether or not a plurality of the input units are connected, and when the judgment is made that one input unit is connected, allowing the inquiry about the mode selection by the mode confirming device, and when the judgment is made that a plurality of the input units are connected, forbidding the inquiry.

According to the seventh aspect, in the case where only one input unit is connected, one player operates the plural operated sections. For this reason, an opportunity to select the first mode or the second mode is given securely to the player before the game is started, and thus a possibility that a player who is not used to the game starts the game in the first mode where the difficulty is high can be eliminated. On the contrary, in the case where a plurality of the input units are connected, a plurality of players share the predetermined number of the operated sections to play the game. As a result, the difficulty of the game is lowered, and a possibility of selecting the second mode is low. Therefore, it is conve- nient that the first mode is allocated as default setting after the initializing operation, and the game is started in the first mode as long as the player consciously selects the second mode before starting the game.

The invention according to an eighth aspect provides the game system depending from the sixth aspect characterized by further comprising an auxiliary storage device (53) in which information about a play history of the player can be recorded, the auxiliary storage device being capable of being connected with the game control unit (11), wherein the mode selecting device comprises a confirmation control device for after the initializing operation is performed, judging as to whether or not information representing the history of the playing in the first mode is recorded in the auxiliary storage device before the game is first executed, and when the judgment is made that the play history in the first mode does not exist, allowing the inquiry about the mode selection by the mode confirming device, and when the judgment is made that a plurality of the play histories exists, forbidding the inquiry.

According to the eighth aspect, in the case where the player does not record a history of the playing in the first mode into the auxiliary storage device, after the initializing operation, the player is inquired about the selection of the modes before the game is first started. On the contrary, after a history of the playing in the first mode is recorded, even when the initializing operation is performed, the player is not inquired about the mode selection before the game is started. Therefore, an opportunity to select the modes is given securely to a player who has not experienced the playing in the first mode, whereas a player who has experienced the playing in the first mode can start the game immediately without the confirmation of the mode selection.

The invention according to a ninth aspect provides a game system characterized by comprising: a display device (20) for displaying a game picture, an input unit (52A, 52B) having a plurality of operation members (PB1 through PB14, PB21 through PB31) to be operated by a player for outputting a signal corresponding to an operation state of the operation members; a storage device (44, 13) for storing allocation data which defines a corresponding relationship between a plurality of the operation members and a predetermined number of operated sections used in a game, and operation timing data which specifies operation timing in the game relating to the operated sections; and a game control unit (11) for checking the output signal from the input unit and the data recorded in the storage device, and simultaneously executing the game according to a predetermined procedure on a screen of the display device, wherein the game control unit comprises an operation instructing device for displaying on the screen of the displaying device during the game, an instruction image(101) for instructing the player to operate each of the predetermined number of operated sections at timing defined by the operation timing data, an evaluating device for evaluating the operation of the input unit by the player performed in response to the instruction from the operation instructing device based on the data defining said operation timing data, an evaluation informing device for informing the player of information relating to the evaluated result by the evaluating device, and an allocation information presenting device for presenting information for specifying the relationship between a plurality of the operation members and the operated sections to the player based on the allocation data.

According to the ninth aspect, by checking the information presented by the allocation information presenting means, the player can easily obtain the corresponding relationship between the operated sections to be used in the game and the actual operation members provided on the input unit. Therefore, even a player who is not used to the game can enjoy the game comfortably without being troubled with the operating method.

The invention according to a tenth aspect provides the game system depending from the ninth aspect characterized in that marks for distinguishing a plurality of the operation members (PB1 through PB12) from each other are displayed on the display unit (52A), and the allocation information presenting device displays an image imitating the marks as the information. Therefore, the corresponding relationship between the marks for distinguishing the plural operation members (PB1 through PB12) displayed on the input unit (52A) and the screen displayed on the screen or the like of the display device is made to be clear, and thus the corresponding relationship between the operated sections and the actual operation members can be obtained more easily.

The invention according to an eleventh aspect provides the game system depending from the ninth aspect characterized in that the allocation information presenting device displays the information on the screen of the display device. Therefore, while the operation instruction displayed on the screen of the display device is being watched closely, the allocation of the operation members can be confirmed easily.

The invention according to a twelfth aspect provides the game system depending from the ninth aspect characterized in that a sub-display device (70) which is different from the display device is provided on the input unit, and the allocation information presenting device displays the information on the screen of the display device.

According to the twelfth aspect, since the corresponding relationship between the operated sections and the actual operation members can be obtained on the screen of the sub-display device on the input unit, the corresponding relationship can be confirmed more quickly and easily.

The invention according to a thirteenth aspect provides the game system depending from ninth aspect characterized in that: a plurality of the input devices (52A, 52B) can be connected with said game control unit (11), and a sub-display device (70) which is different from the display device is provided for each of the plural input units, and the allocation information presenting device displays the information on the screen of the sub-display device. According to the thirteenth aspect, in the case where the operated sections to be used in the game are allocated to the plural input units, the allocation of the operated sections relating to the input units corresponding to the sub-display unit can be displayed on a screen of the respective sub-display device. As a result, the corresponding relationship in the case especially where the plural display device are used can be obtained more conveniently.

The invention according to a fourteenth aspect provides the game system depending from the ninth aspect characterized in that the game control unit (11) comprises an information display selecting device for making a selection according to an instruction from the player as to whether or not the information for specifying the relationship between the operation members is to be displayed, and an allocation information display control device for when display of the information is selected by the information display selecting device, allowing the display of the information by the allocation information presenting device, and when a pause of information display is selected, forbidding the display of the information by the allocation information presenting device.

According to the fourteenth aspect, a selection can be made as to whether or not the information for specifying the relationship between the plural operation members and the operated sections is displayed according to player's choice.

The invention according to a fifteenth aspect provides the game system depending from the ninth aspect characterized in that: the operation instructing device displays a gauge (101), which is dividable into parallel tracks (102a through 102i) corresponding to the predetermined number of operated sections and has indexes (103) for showing the operation timing of the operated sections correspondingly to the tracks, as an image for instructing the operation of the predetermined number of operated sections, and gradually changes display positions of the indexes along the tracks according to the proceeding of the game so that when the operation timing of the operated sections corresponding to the tracks comes, the indexes reach predetermined positions of the gauge, and the allocation information presenting device displays the information for specifying the relationship between the plurality of operation members and the operated sections in a vicinity of the predetermined position of the gauge.

According to the fifteenth aspect, the player tries to closely watch the predetermined position in the gauge to obtain the operation timing, but since the allocation information presenting means presents the information in the vicinity of the predetermined position, a moving amount of the player's eyes at the time of confirming the information can be suppressed minimally. As a result, the player can play the game more comfortably.

The invention according to a sixteenth aspect provides the game system depending from the ninth aspect characterized in that the game control unit (11) comprises, an allocation changing device for changing the corresponding relationship between a plurality of the operation members and a predetermined number of operated sections used in the game according to an instruction from the player; and data updating means for updating the allocation data recorded in the storage device according to the change in the allocation by means of the allocation changing means.

According to the sixteenth aspect, since the corresponding relationship between the plural operation members and a predetermined number of the operated sections can be changed according to player's choice, the player can play the game more comfortably.

The invention according to a seventeenth aspect provides a storage medium (44, 13) readable by a computer, into which operation timing data which specify operation timing during a game relating to a predetermined number of operated sections allocated at least some of a plurality of operation members (PB1 through PB14, PB21 through PB31) provided on an input unit (52A, 52B) of a game system, and a program for operating the computer (11) provided in the game system as a game control unit for executing the game according to a predetermined procedure while checking an output signal from the input unit and the operation timing data were recorded, the program operating the computer as an operation instructing device for displaying on the screen of the displaying device during the game, an instruction image(101) for instructing the player to operate each of the predetermined number of operated sections at timing defined by the operation timing data, a mode selecting device for selecting a first mode for setting a number of the operated sections used in the game to the predetermined number or a second mode for limiting the number to a limited number smaller than the predetermined number according to an instruction from a player, an operation instruction limiting device for changing the instruction image displayed through the operation instructing device so as to instruct the player to operate only said limited number of operated sections, during the second mode, evaluating means for evaluating the operation of the input unit by the player in response to the instruction from the operation instructing means based on the operation timing data; and an evaluation informing device for informing the player of information relating to the evaluated result by the evaluating device.

According to the seventeenth aspect, the programs recorded in the storage medium are read by the computer to be executed so that the game system according to the first aspect can be realized.

The invention according to an eighteenth aspect provides a storage medium (44, 13) readable by a computer, into which allocation data which specify a corresponding relationship between a plurality of operation members (PB1 through PB14, PB21 through PB31) on an input unit (52A, 52B) provided in a game system and a predetermined number of operated sections used in a game, operation timing data which specify operation timing during the game relating to the operated sections, and a program for operating the computer (11) provided in the game system as a game control unit for executing the game according to a predetermined procedure while checking an output signal from the input unit and the operation timing data were recorded, the programs operating said computer as an operation instructing device for displaying on the screen of the displaying device during the game, an instruction image(101) for instructing the player to operate each of the predetermined number of operated sections at timing defined by the operation timing data, an evaluating means for evaluating the operation of the input unit by the player in response to the instruction from the operation instructing means based on the operation timing data, an evaluation informing device for informing the player of information relating to the evaluated result by the evaluating device, and an allocation information presenting device for presenting information which specifies the relationship between the plural operation members and the operated sections to the player based on the allocation data.

According to the eighteenth aspect, the programs recorded in the storage medium are read by the computer to be executed so that the game system according to the ninth aspect can be realized.

BRIEF DESCRIPTION OF THE DRAWINGS

FIG. 3 is a diagram showing one example of a dedicated controller used in the game system of FIG. 1.

FIG. 4 is a diagram showing a main screen of a game executed in the game system of FIG. 1.

FIG. 5 is a diagram showing a corresponding relationship between operation buttons used in the game of FIG. 4 and actual pushbutton switches on the controller.

FIG. 22 is a diagram showing one example of the game screen when the process of FIG. 19 is executed in a sate that the 5 button mode is ON.

DETAILED DESCRIPTION OF THE PREFERRED EMBODIMENTS

Figure 1:
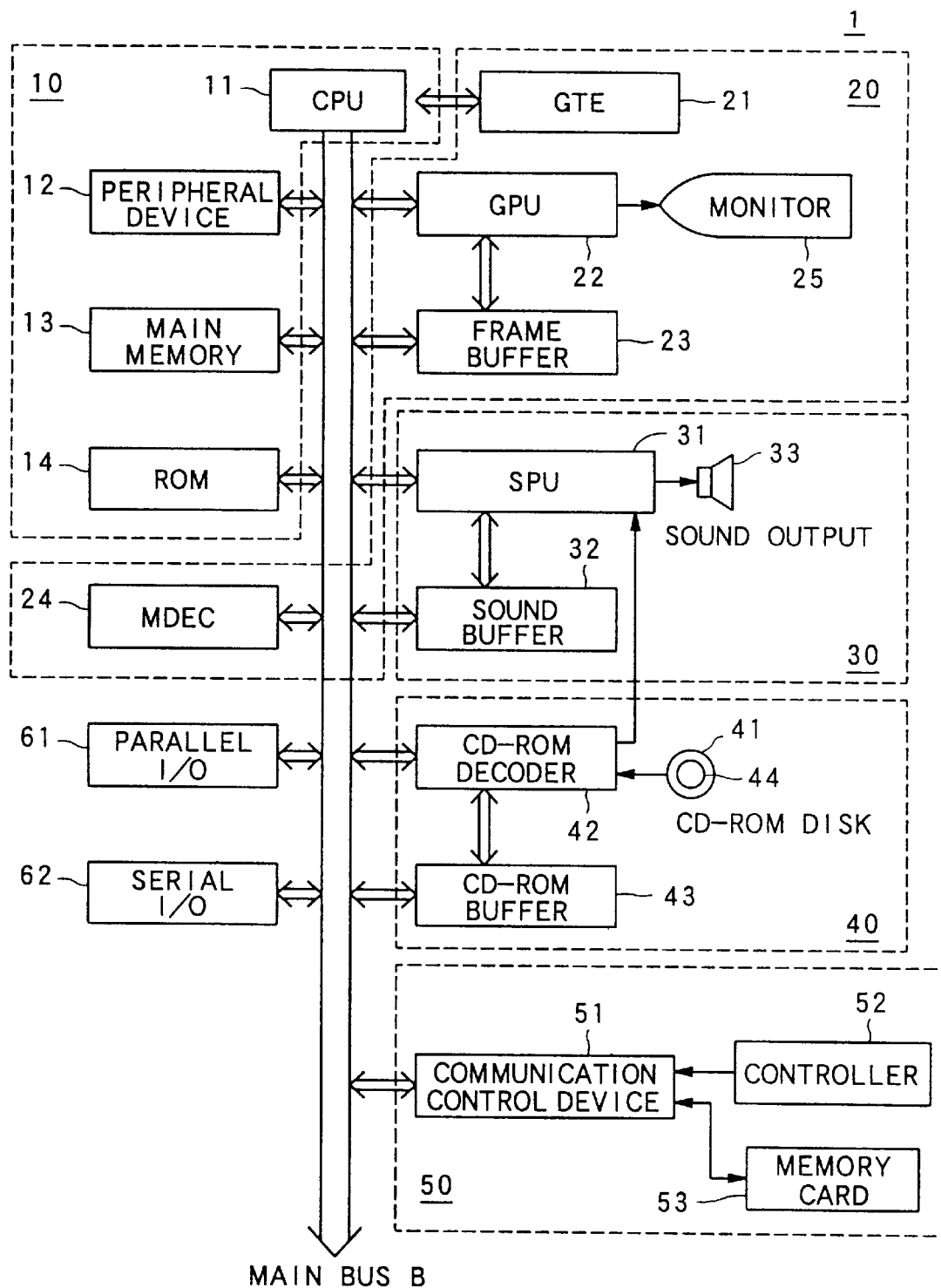
FIG. 1 is a block diagram of a game system according to one embodiment of the present invention.

FIG. 1 shows an embodiment of the present invention as a home-use game system. Here, a constitution of FIG. 1 is a general one which a home-use computer game machine has, and its detail is disclosed in Japanese Patent Application Laid-Open No. 8-212377, for example.

A game system of FIG. 1 has a main control section 10, a graphic control section 20, a sound control section 30, a disk reading section 40 and a communication control section 50. The respective sections 10 through 50 are connected with each other by a main bus B. The main control section 10 comprises a CPU 11 composed mainly of a microprocessor for executing operation required for proceeding of a game and controlling the respective sections, a peripheral device 12 for controlling interruption to the CPU 11 and executing auxiliary control such as management of memory access or the like, a main memory 13 composed of a rewritable semiconductor storage element such as a RAM, and a ROM 14 into which programs for controlling basic operations of the game system 1 are stored.

The graphic control section 20 comprises a geometry transfer engine (GTE) 21 as a co-processor, a graphics processing unit (GPU) 22, a frame buffer 23 and an image decoder (MDEC) 24. The geometry transfer engine 21 executes specified arithmetic required for drawing an image according to an instruction from the CPU 11, such as operation of a coordinate of a polygon for drawing a three-dimensional image. The graphics processing unit 22 executes a predetermined drawing process according to a drawing command from the CPU 11. The frame buffer 23 as means for temporarily storing data which were drawn by the GPU 22. The image decoder 24 for decoding compressed data of the image stored in the main memory 13. During the proceeding of the game, image data recorded in a CD-ROM 44 as a storage medium are loaded to the main memory 13 as required and are decoded by the MDEC 24 so as to be drawn in the frame buffer 23 by the GPU 22. An arbitrary area of the image frame drawn in the frame buffer 23 is displayed on a monitor 25 (for example, CRT of a home-use television set).

The sound control section 30 comprises a sound reproducing processor (SPU) 31, a sound buffer 32 of 512 kilobytes, for example and a speaker 33 as sound output means. The sound reproducing processor 31 generates a musical sound, a sound effect and the like based on an instruction from the CPU 11. Data of a voice and a musical sound, sound source data and the like which are read from the CD-ROM 44 are stored in the sound buffer 32. The speaker 33 outputs a musical sound, a sound effect and the like generated by the SPU 31.

The SPU 31 has an ADPCM decoding function for reproducing voice data obtained by adaptive-differentially coding (ADPCM) voice data of 16 bits as a differential signal of 4 bits, a reproducing function for reproducing sound source data stored in the sound buffer 32 to generate a sound effect and the like, a modulating function for modulating voice data and the like stored in the sound buffer 32 to reproduce the modulated voice data, and the like. Namely, the SPU 31 has a function such as automatic conversion of an operation parameter whose coefficient is looping and time, and contains ADPCE sound source having a power of 24 voices, and the SPU 31 is operated by the CPU 11. Moreover, the SPU 31 manages an original address space mapped by the sound buffer 32, and transmits ADPCM data to the sound buffer 32, and reproduces data by directly giving key-on/key-off and modulation information.

The sound control section 30 has such functions so as to be capable of being used as a so-called sampling sound source for generating a musical sound, sound effect and the like based on voice data and the like recorded in the sound buffer 32 according to an instruction from the CPU 11.

The disk reading section 40 comprises a disk drive 41, a decoder 42 and a buffer 43 of 32 kilobytes, for example. The disk drive 41 reproduces programs, data and the like recorded in the CD-ROM 44. The decoder 42 decodes programs, data and the like to which error correcting (ECC) codes, for example, are added and recorded. The buffer 43 temporarily stores the reproduced data from the disk drive 41. Namely, the disk reading section 40 is composed of members which are required for reading disks such as the disk drive 41 and the decoder 42. Here, data of CD-DA, CD-ROM, XA and the like as a disk format can be supported. Here, the decoder 42 serves also as a part of the sound control section 30.

As the voice data recorded on a disk reproduced by the disk drive 41, there are the above-mentioned ADPCM data (ADPCM data and the like of CD-ROM XA) as well as so-called PCM data obtained by converting analog data of a sound signal into digital one. Voice data as ADPCM data, which are recorded with a difference of digital data of 16 bits, for example, being represented by 4 bits, are corrected and decoded by the decoder 42 to be supplied to the SPU 31. After the voice data which were subject to a process such as digital/analog conversion by in the SPU 31, they are used for driving the speaker 33. Moreover, voice data as PCM data which are recorded as digital data of 16 bits, for example, are decoded by the decoder 42 and are used for driving the speaker 33. Here, an audio output of the decoder 42 enters the SPU 31 temporarily to be mixed with a SPU output and becomes a final audio output via a reverb unit.

The communication control section 50 comprises a communication control device 51 for controlling communication with the CPU 11 via the main bus B, a controller 52 as operation input means having a plurality of operation members (for example, pushbutton switches) operated by a player of a game, and a memory card (auxiliary storage medium) 53 mainly composed of a semiconductor element to which rewriting and storage are possible. A signal representing an operation state of the operating member is outputted from the controller 52 with a predetermined period (for example, 60 times per second), and its output signal is transmitted to the CPU 11 via the communication control device 51. Here, in FIG. 1 shows only one set of the controller 52 and memory card 53, but the communication control device 51 is provided with a plurality of connection ports. Each of the ports can be mounted to or detached from the controller 52 and the memory card 53.

Furthermore, the game system 1 comprises a parallel I/O (input/output) port 61 and a serial I/O port 62 for connecting peripheral equipment. The serial I/O port 62 can be connected with another game system 1 via a communication cable, not shown, and this connection enables communication between the two game systems 1,1 and proceeding of a game.

Figure 2A:
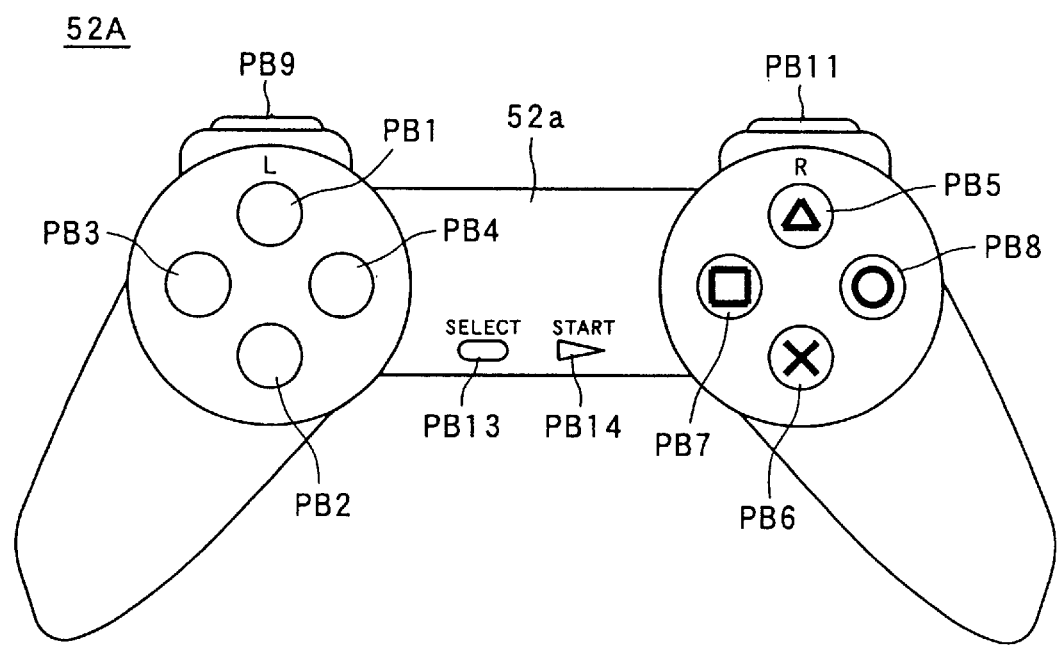
FIG. 2 is a diagram showing one example of a general-purpose controller used in the game system of FIG. 1.
Figure 2B:
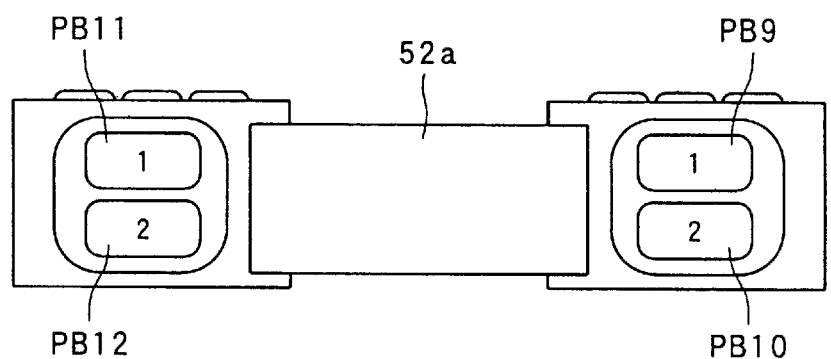

FIGS. 2 and 3 show examples of controllers detachable from the communication control device 51. FIG. 2 shows a general-purpose controller commonly used in various games, and FIG. 2(a) is a plan view and FIG. 2(b) is a front view. Meanwhile, FIG. 3 is a plan view of a dedicated controller 52A which is constituted according to games executed in the game system of the present invention. In the following description, the controller of FIG. 2 is shown as a general-purpose controller, and the controller of FIG. 3 is shown as a dedicated controller 52B, and when it is not necessary to distinguish between them, shown as a controller 52.

As shown in FIG. 2, the general-purpose controller 52A has a portable main body 52a. Four pushbutton switches PB1 through PB4 and four push button switches PB5 through PB8 are provided on right and left of an upper surface of the main body 52a. The pushbutton switches PB1 through PB4 on the left side serve as so-called direction indicating keys for indicating up-and-down and right-and-left directions. Here, in FIG. 2 the pushbutton switches PB1 through PB4 are independent of each other, but a single operation switch which can be operated in arbitrary directions is occasionally used instead of the pushbutton switches. The pushbutton switches PB5 through PB8 on the right side are used for inputting, selecting, determining and canceling various commands and the like. Moreover, two pushbutton switches PB9 and PB10 and two pushbuttons PB11 and PB12 are provided respectively on right and left of a front surface of the main body 52a. Suitable signs are provided on or around the pushbutton switches PB5 through PB 12 so that the pushbutton switches are visually distinguished from each other. In the shown example, symbols ○, △, □ and × are shown on the pushbutton switches PB5 through PB8. A number "1" is shown on the pushbutton switches PB9 and PB11, and a number "2" is shown on the pushbutton switches PB10 and PB12. A letter "L" is shown above the pushbutton switch PB9, and a letter "R" is shown above the pushbutton switch PB11. As a result, a player can understand that the switch PB5 is a △ button, the switch PB6 is a × button, the switch PB7 is a □ button, the switch PB8 is a ○ button, the switch PB9 is a L1 button, the switch PB10 is a L2 button, the switch PB11 is a R1 button, and the switch PB12 is a R2 button. Further, pushbutton switches PB13 and PB14 are provided on a center part of the upper surface of the main body 52a. The pushbutton switch PB13 serves as a select button, and the pushbutton switch PB14 serves as a start button. Here, being omitted in FIG. 2, but a stick-type input device for outputting an analog signal according to an operation direction and a quantity of operation is occasionally added to the general-purpose controller 52A. A vibrator for oscillating the main body 52a is occasionally comprised therein.

Meanwhile, as shown in FIG. 3, the dedicated controller 52B has a trapezoidal main body 52b. The main body 52b is formed into a size of which use on the table is considered. Nine circular pushbutton switches PB21 through PB29 are provided on an upper surface of the main body 52b so as to be arranged on up and down lines. Small pushbutton switches PB30 and PB31 are provided above the pushbutton switches PB21 through PB29. The pushbutton switches PB30 and PB31 serve respectively as select buttons and a start buttons similarly to the pushbutton switches PB13 and PB14 of the general-purpose controller 52A. Each pushbutton switches PB21 through PB29 are colored with one of five colors. For example, the switches PB21 and PB29 on both ends of the lower line are colored white, the switches PB23 and PB27 on the inner side are colored light green, the switch PB25 on the center of the lower line is colored pink, the switches PB22 and 28 on both the ends of the upper line are colored yellow, and the switches PB24 and PB26 on the inner side are colored light blue.

The dedicated controller 52B outputs a signal for specifying ON/OFF state of the pushbutton switches PB21 through PB31 with constant period with it being connected with the communication control device 51, and accordingly outputs a judging signal with constant period for distinguishing the dedicated controller 52B from the general-purpose controller 52A. The judging signal is a signal corresponding to a specified operation state of the general-purpose controller 52A. For example, a signal, which corresponds to an output signal when the switches PB2, PB3 and PB4 of the direction indicating keys of the general-purpose controller 52A are simultaneously pushed down (turned ON), is outputted as the judging signal. The operation state according to the judging signal may be selected freely from a state where the switches are not simultaneously operated during a game at all or a state where unusual combination of the switches are simultaneously switched.

Programs of the game and various data required for executing the games are written onto the CD-ROM 44. When a predetermined initializing operation such as an operation of the power source switch or a reset switch, not shown is performed, the CPU 11 executes a predetermined initializing process according to the program of the ROM 14, and thereafter reads the programs and data recorded on the CD-ROM 44 into the main memory 13 to start the process peculiar to the game. As for the outline of the game to be executed, an instruction is given to the player via the monitor so that predetermined BGM is reproduced from the loudspeaker 33 and simultaneously the player operates the operation buttons on the controller 52 according to the steps of the BGM. Moreover, when the player operates the controller 52 in response to the instruction, the sound effect according to the operation is superimposed on the BGM to be outputted from the loudspeaker 33, and the operation is judged to be displayed on the monitor 25. The detail of the game will be mentioned later.

FIG. 4 shows a basic game screen displayed on the screen of the monitor 25. The gauge 101 for instructing the player as for operation timing of the operation buttons on the controller 52 is displayed on an approximately center portion of the game screen 100. In the present embodiment, the game is constituted on condition that the game is played by utilizing the nine operation buttons. For this reason, the gauge 101 is divided logically into nine tracks 102a through 102i which are extended in up-and-down direction. Timing marks 103 for showing the operation timing of the operation buttons are displayed correspondingly on the tracks 102a through 102i. Here, imaginary lines which divides the tracks 102a through 102i are not displayed on the actual screen. Moreover, in FIG. 4, lines 104 in up-and-down direction are displayed respectively on each track 102, but they are occasionally omitted.

FIG. 5 shows one example of the corresponding relationship between the tracks 102a through 102i and the pushbutton switches on the controller 52. In FIG. 5, operation buttons A through I are defined as the sections to be operated allocated to the controller 52 according to the tracks 102a through 102i of FIG. 4 in the game. Since there are two cases that single general-purpose controller is used and two general-purpose controllers are used simultaneously, the case where single controller is used is represented by "1P", and the case where two controllers are used is represented by "1P & 2P". Incidentally, "1P" means the first player, and "2P" means the second player.

As is clear from FIG. 5, in the case where the two general-purpose controllers 52A are used, the five tracks 102a through 102e on the left side of the nine tracks 102a through 102i in the gauge 101 have one to one correspondence to the controller 52A on the 1P side, and five tracks 102e through 102i on the right side have one to one correspondence to the controller 52A on the 2P side. Namely, in the case where the game is played by using the two general-purpose controller 52A, the two players divide up the operations corresponding to the instructions in the tracks 102a through 102i. Here, the corresponding relationship as to the general-purpose controllers 52A is just one example, and thus a plurality of setting patterns are also prepared. Data that define the setting patterns are previously stored in the CD-ROM 44, and the setting according to player's taste and playing environment is read into the main memory 13.

Meanwhile, in the case of the dedicated controller 52B, since the number of the tracks 102a through 102i is equal to the number of the pushbutton switches PB21 through PB29, the track 102a on the left end of the screen has correspondence to the pushbutton switch PB21 on the left end of the lower line of the controller 52B, the second track 102b from left has correspondence to the pushbutton switch PB22 on the left end of the upper line, and hereinafter, the tracks 102c through 102i similarly have one to one correspondence to the pushbutton switches PB23 through PB29 according to the arranging order. In order to clarify the corresponding relationship between the pushbutton switches PB21 through PB29 and the tracks 102a through 102i, portions which are shown by colors same as those of the corresponding pushbutton switches PB21 through PB29 are provided to the tracks 102a through 102i. For example, at least one portion of the timing mark 103 displayed on or above each of the lines 104 in the gauge 101 is represented by the color same as that of each of the corresponding pushbutton switches PB21 through PB29.

When the game is started, the timing mark 103 gradually moves downward along the tracks 102a through 102i according to the control of the CPU 11. When the timing mark 103 reaches the lowest ends of the tracks 102a through 102i, operation timing of the operation buttons corresponding to the tracks 102a through 102i comes. When the player pushes down the corresponding pushbutton switch on the controller 52 according to the operation timing, the CPU 11 judges as to whether or not the operation is satisfactory based on a lag between the operation timing indicated by the timing mark 103 and the timing at which the operation was actually performed, and displays the judged result on judgment display sections 105 positioned at the lower end of the tracks 102a through 102i. The judgment display section 105 is designed as an elliptic operation button, and they are arranged in up and down lines similarly to the pushbutton switches PB21 through PB29 of the dedicated controller 52B. Words such as "COOL!", "YES"!"and "WACK" are displayed on each of the judgment display sections 105 according to the judged results. Here, the judged results may be displayed on the gauge 101.

A score display section 106 for displaying a score of the game (1234 points in the drawing) is provided on the lower left part of the screen 100. The score is a value calculated based on the judged result per operation timing. A title display section 107 for displaying a stage content and a title of BGM is provided on the lower right part of the screen 100. Character display sections 108L and 108R are provided respectively on both sides of the gauge 101. Animations or the like of game characters are displayed on the display sections 108L and 108R. The characters to be displayed change according to BGM, and the contents of the animations change according to the judged result per operation timing, for example.

Figure 6A:
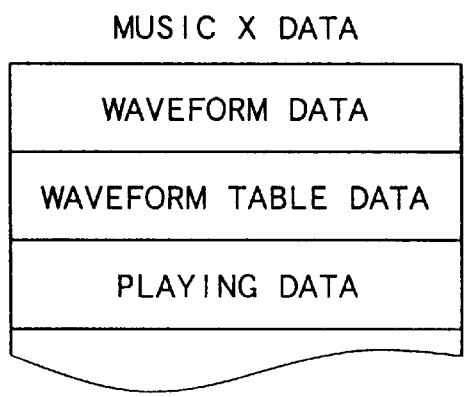
FIG. 6 is a diagram showing a constitution of data of music X recorded in a CD-ROM of FIG. 1.
Figure 6B:
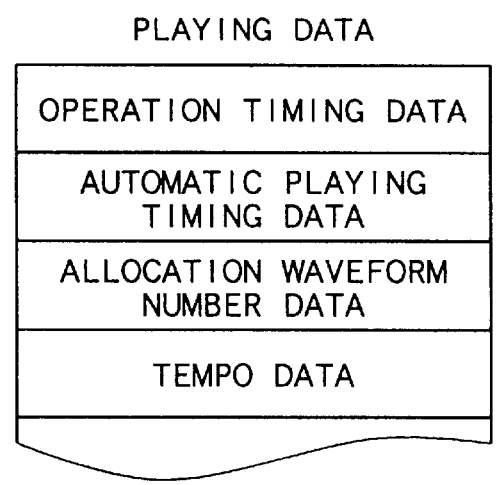
Figure 7:
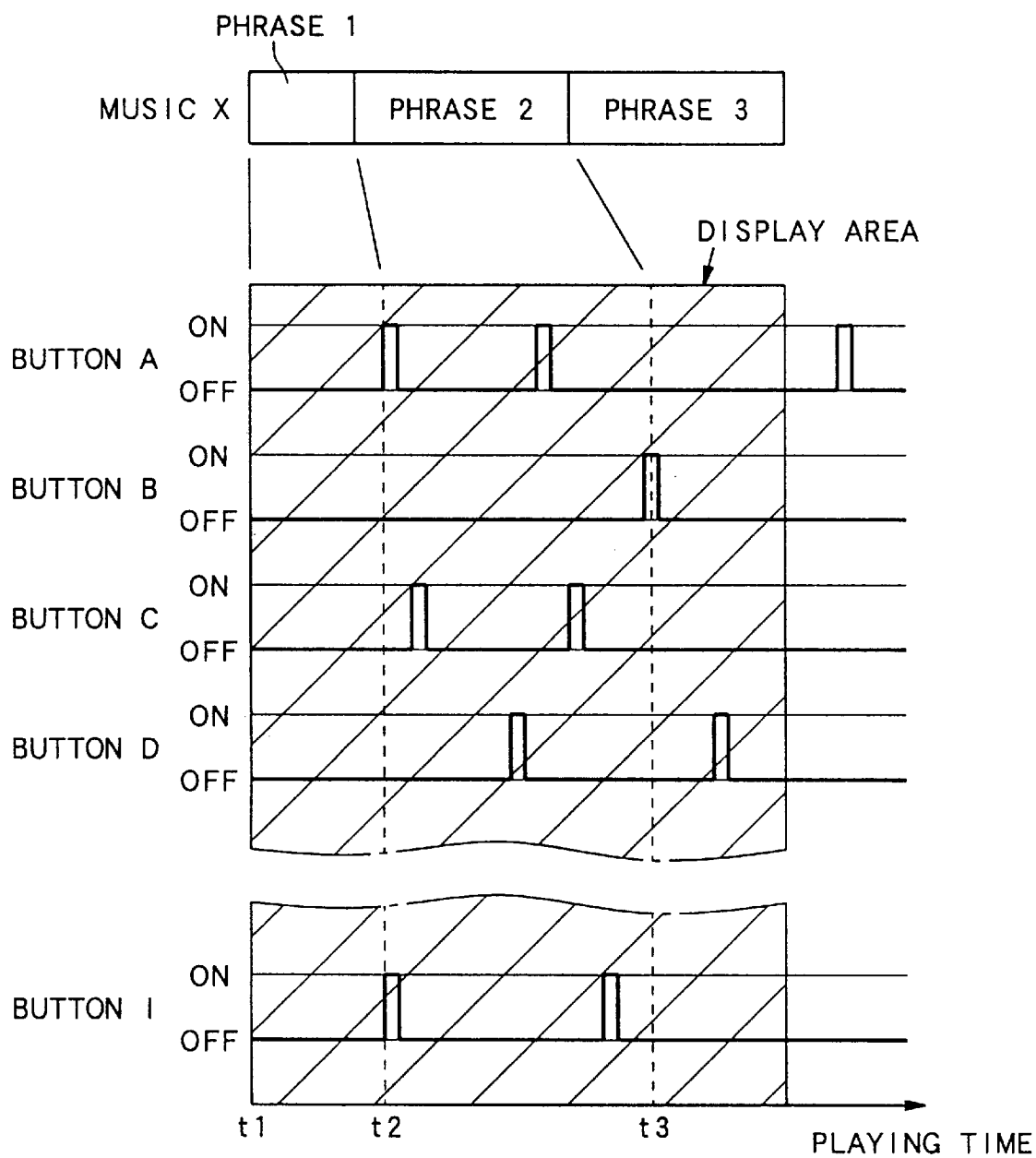
FIG. 7 is a diagram showing a part of operation timing data of FIG. 6(b) as a time chart.

FIGS. 6 and 7 show constitutions of data relating to the reproduction of BGM and the display control of the gauge 101 of the data recorded on the CD-ROM 44. In the game system 1, plural pieces of music as BGM used in the game are previously prepared, and data shown in FIG. 6(*a*) are created per piece of music to be recorded on the CD-ROM 44. The data of music X comprises waveform data, waveform table data and performance data. The waveform data are data that a waveform for reproducing the music X is defined, and the sound effect data are data that a sound to be generated when the controller 52 is operated during the game is defined. These data are created and recorded as PCM or ADPCM data, for example. The sound effect data are comprised in the data per music in order to generate a sound effect suitable to a type of BGM. On the waveform table data, information, which is required for taking out data of desired BGM and sound effect from the waveform data, is described.

As shown in FIG. 6(*b*), the performance data comprises operation timing data, automatic playing timing data, allocation waveform number data and tempo data. The operation timing data are such that operation timing of the operation members having one to one correspondence to the tracks 102a through 102i is specified according to elapsed time from the start of playing the music X. In other words, the operation timing data are such that certain time during the reproduction of the music X at which the pushbutton switches, etc. of the controller 52 are operated is previously set for each of the tracks 102a through 102i. The operation timing data becomes the basis of the judgments as to the display of the gauge 101 and the operation of the controller 52.

FIG. 7 shows partial operation timing data of each operation button A through I as a time chart. ON positions in the drawing correspond to timing at which the operation buttons A through I should be operated. In the operation timing data, each of the operation timing is specified by an elapsed time from the head of the music X according to a time axis (corresponding to a horizontal axis) on a basis of the head of BGM. The music X as BGM is composed of a plurality of phrases. Time t1, t2, t3 . . . divided per phrase is recorded in the operation timing data correspondingly to the phrase numbers. The phrase numbers are serial numbers given to the phrases in the order of playing phrases starting the first phrase with 1.

The automatic playing timing data shown in FIG. 6(*b*) are provided for generating a sound effect even if the controller 52 is not operated. Namely, the automatic playing timing data are such that the timing, at which a sound effect is generated when the operation buttons A through I are regarded as being operated, is specified by the elapsed time from the head of the music X. Here, the automatic playing data are not always required for executing the game, and thus they can be omitted.

Figures 8, 9:
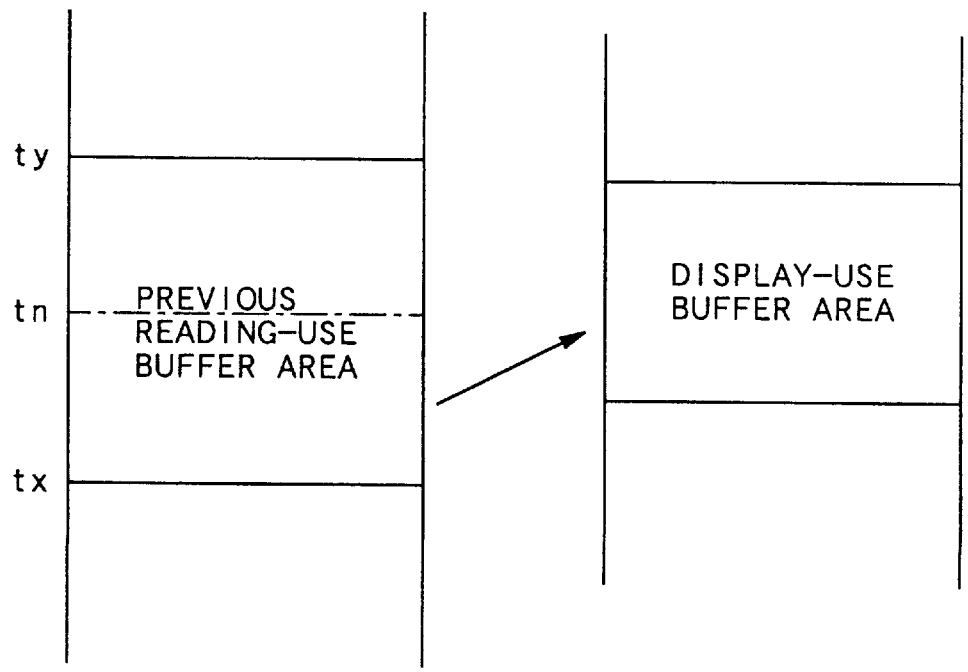
FIG. 8 is a diagram showing a corresponding relationship between the operation buttons of FIG. 7 and sound effects outputted in response to the operation of buttons.
FIG. 9 is a diagram showing a state that the operation timing data of FIG. 6 are read into a main memory.

The allocation waveform number data is the data which specifies a relationship between an operation of the controller 52 and a sound effect. This relationship may be constant through the music X or may be changed per suitable division (for example, phrase of music X). FIG. 8 shows one example of the allocation waveform number data in the case where a sound effect changes per phrase. In the data, the operation buttons A through I have one to one correspondence to sound effects to be generated in each phrase. For example, as for the operation button A, a sound effect 1 is allocated for a phrase 1, a sound effect 11 is allocated for a phrase 2, and a sound effect 1 is allocated for a phrase 3. Therefore, when a pushbutton switch (for example, the pushbutton switch PB21 of the dedicated controller 52B) on the controller 52 defined as the operation button A is operated, the sound effect 1 is superimposed on the BGM in the phrases 1 and 3, and the sound effect 11 is superimposed on the BGM in the phrase 2.

The tempo data of FIG. 6(*b*) is the data showing the tempo of playing the music X. In the case where the tempo changes while the music X is performed, the tempo is recorded corresponding to a time from the start of the performance. In the game system 1, the display range of the gauge 101 is controlled referring to the tempo data.

FIG. 9 shows a relationship between a reading range of the operation timing data and the display range of the gauge 101 during the playing of the game. During the game, the previous reading-use buffer area as to the operation timing data is set in the main memory 13, and the operation timing data from the current time tx to the time ty on a basis of the playing start time is read in the buffer area. Operation timing data in the range of the current time tx to the time tn (<ty) of the data read in the previous reading-use buffer area is further read into the display-use buffer area of the main memory 13. The time in the range of the current time tx to the time tn is set to be equal with two bars of the music X, the time length changes according to the playing tempo of the music X. Therefore, the CPU 11 determines the time tn, which corresponds to two bars after the current time tx, referring to the tempo data, and reads the operation timing data in the range of the time tx to tn as the display range of the gauge 101 into the display-use buffer area. The CPU 11 calculates an arrangement of the timing mark 103 within the gauge 101 according to the operation timing data read into the display-use buffer area, and creates image data for displaying the gauge 101 based on the calculated result. The graphic control section 20 updates the game screen 100 based on the image data so that the gauge 101 which is suitable to the current time tx is displayed in the game screen 100. Here, The time ty in the previous reading area may be changed according to the tempo of the music X. It is not limited that a quantity of reading into the display-use buffer area corresponds to two bars, and thus the quantity may be changed variously.

Figure 10:
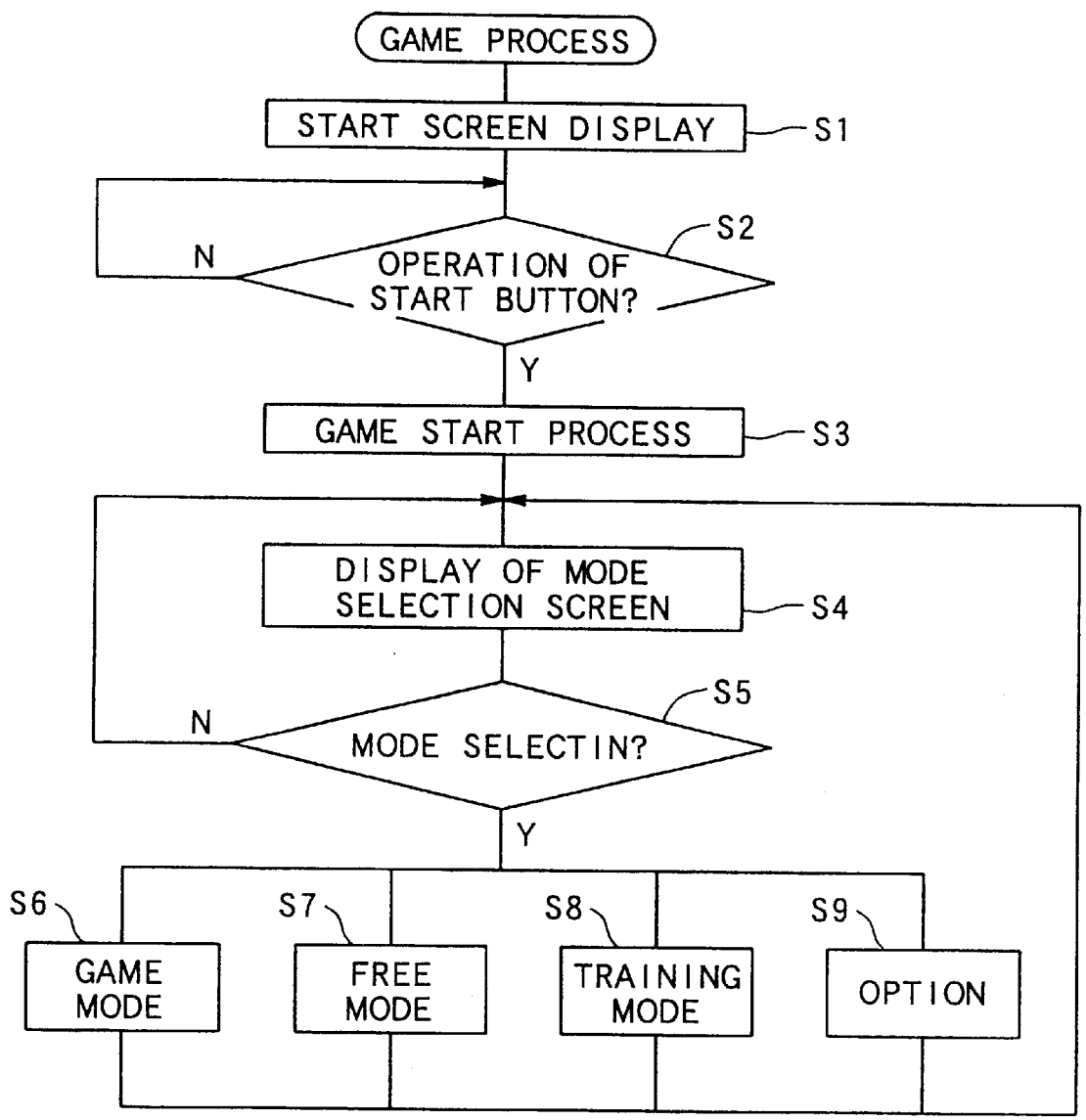
FIG. 10 is a flow chart showing a main routine of a game process executed by a CPU of FIG. 1.

FIG. 10 is a flow chart showing a main routine of the game process executed by the CPU 11 according to the program recorded on the CD-ROM 44. In this process, a predetermined start screen is displayed on the screen of the monitor 25 (step S1), and a judgment is made as to whether or not the start button of the controller 52 is operated (step S2). The start screen is such as a screen 200 shown in FIG. 11, for example.

Figure 11:
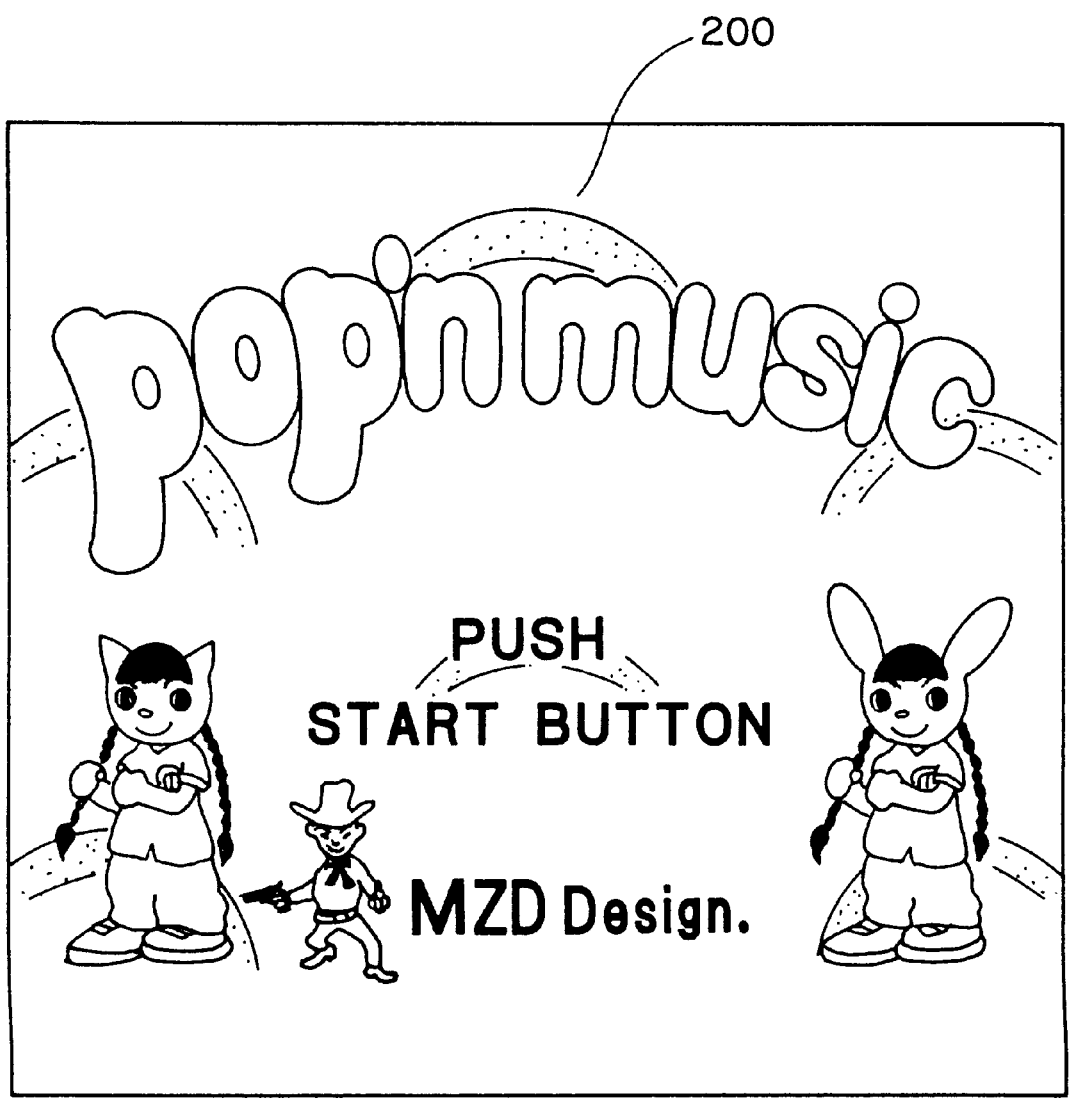
FIG. 11 is a diagram showing a start screen displayed just after the game process of FIG. 10 is started.

When the start button is operated in the state that the screen 200 of FIG. 11 is displayed, the CPU 11 goes to step S3 of FIG. 10 to execute a game start process. The detail will be described later. Here, when no operation is performed within the predetermined time at step S2, the process may shift to the mode for displaying the demonstration screen.

After step S3, the mode selection screen is displayed on the screen of the monitor 25 (step S4). The mode selection screen is such as a screen 210 of FIG. 12, for example. On the screen 210, "START GAME", "FREE", "TRAINING" and "OPTION" as choices for the player are displayed. When the player selects one of these four modes, the process according to the mode is executed (step S5→one of steps S6 through S9).

Namely, when "START GAME" is selected, the game mode process is executed (step S6). In this mode, the game proceeds in such a manner that after the player clears one piece of music (BGM), the player sets about next music. When "FREE" is selected, the free mode process is executed (step S7). In this mode, the player can play his or her favorite music. When "TRAINING" is selected, the training mode process is executed (step S8). In this mode, the player can practice his or her desirable music where a practicing range was set. When "OPTION" is selected, the option setting process is executed (step S9). In this mode, the player can set a way of proceeding with the game or the like according to the player's taste.

Figure 13:
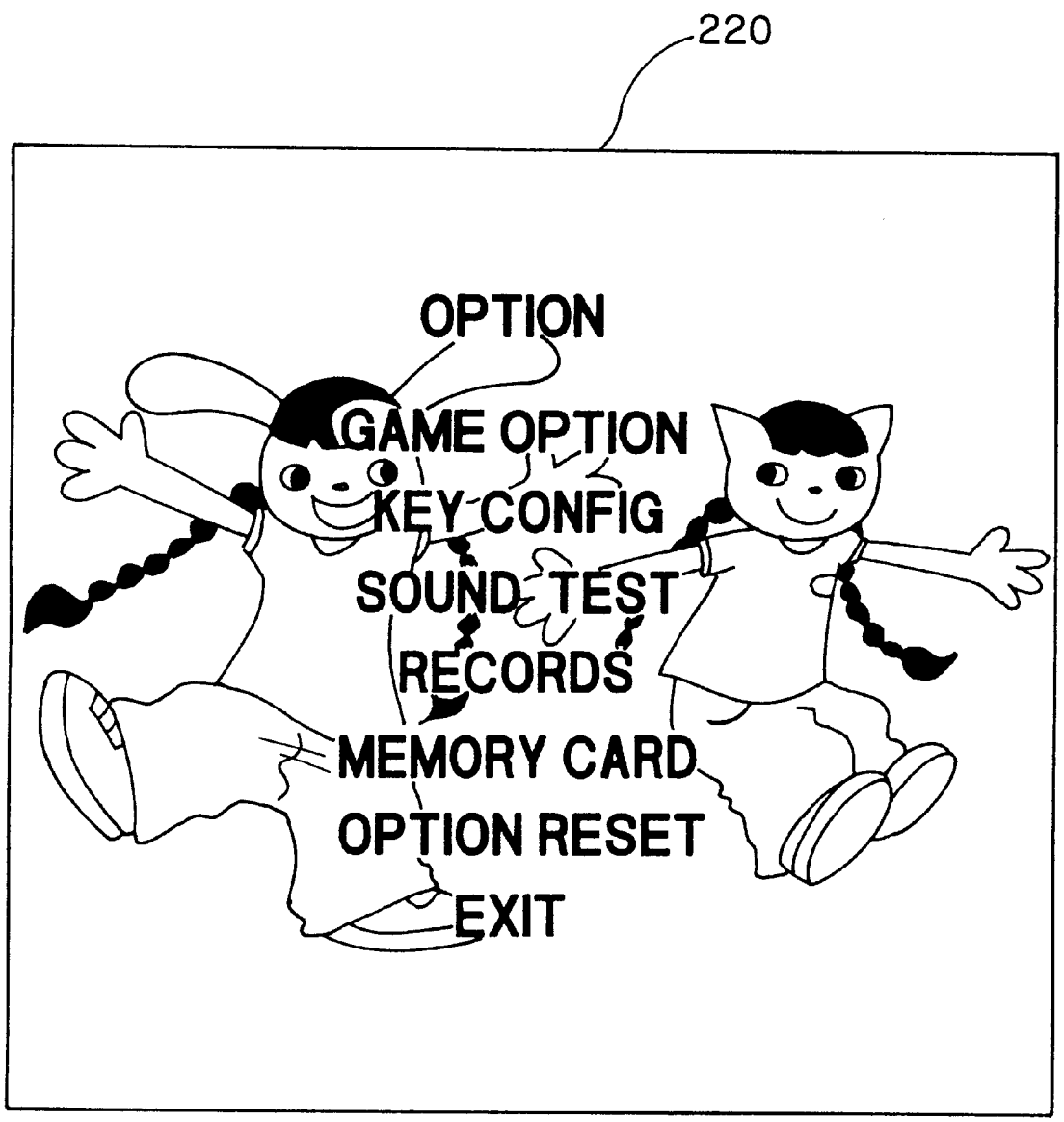
FIG. 13 is a diagram showing a screen displayed when an item "OPTION" is selected on the mode selection screen of FIG. 12.
Figure 14:
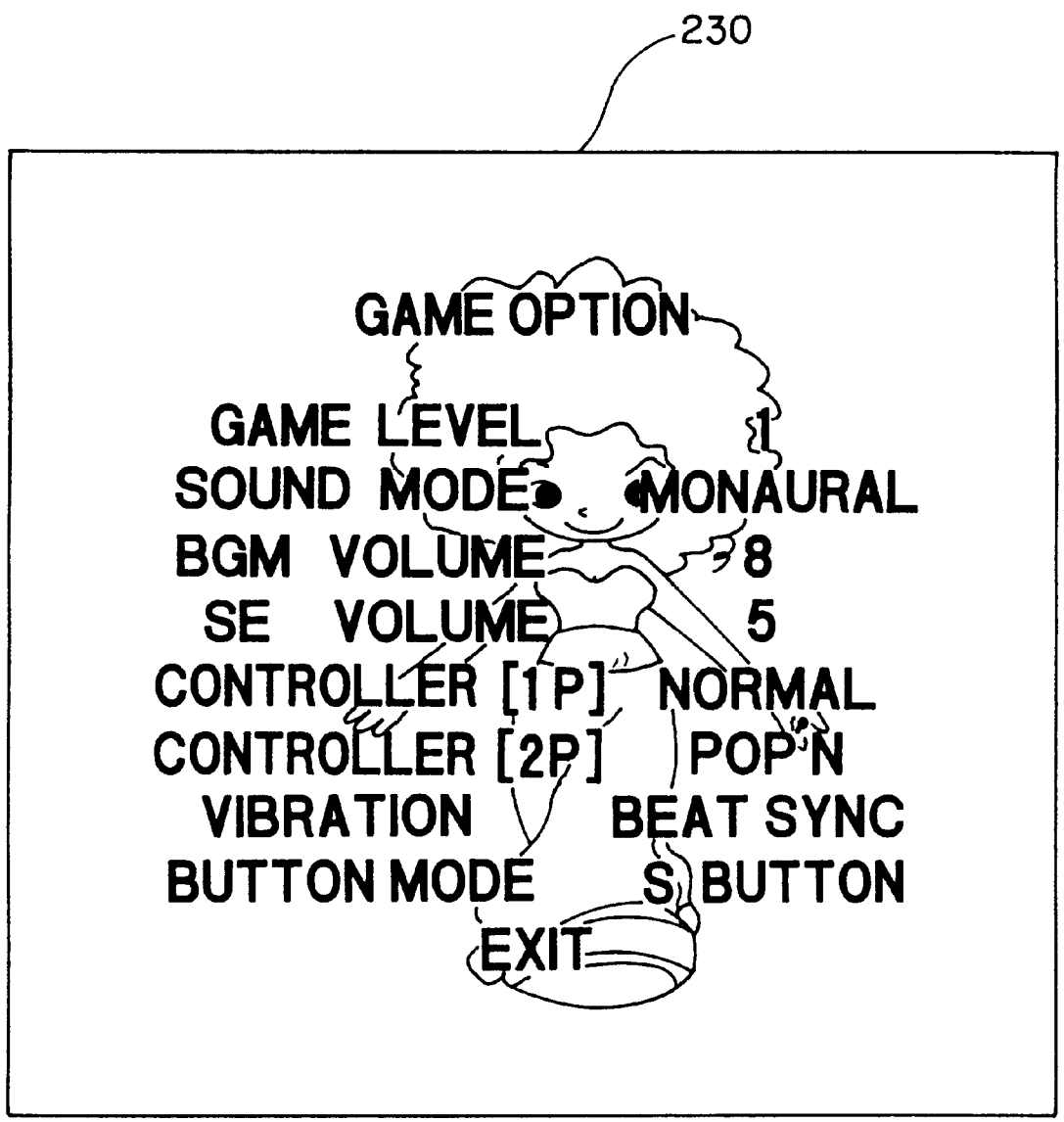
FIG. 14 is a diagram showing a screen when an item "GAME OPTION" is further selected on the screen of FIG. 13.

In the option mode, a screen 220 shown in FIG. 13 is displayed on the monitor 25. On the screen 220, "GAME OPTION", KEY CONFIG", "SOUND TEST", "RECORDS", "MEMORY CARD" and "OPTION RESET" are prepared as setting items which can be selected. When "KEY CONFIG" is selected, the corresponding relationship between the switches PB1 through PB12 of the general-purpose controller 52A and the tracks 102a through 102i of the gauge 101 can be changed to be set. When "SOUND TEST" is selected, BGM can be selected and reproduced. When "RECORDS" is selected, records of former games can be shown. When "MEMORY CARD" is selected, data relating to the memory card 53 (for example, former playing history and setting states of various option items) can be saved or loaded. When "OPTION RESET" is selected, each of the setting items can be returned to the initial state. When "GAME OPTION" is selected, a screen 230 of FIG. 14 is further displayed.

On the screen 230, "GAME LEVEL", "SOUND MODE", "BGM VOLUME", "SE VOLUME", "CONTROLLER 1P", "CONTROLLER 2P", "VIBRATION" and "BUTTON MODE" are prepared as setting items which can be selected. When "GAME LEVEL" is selected, the difficulty of a game can be selected from several steps. When "SOUND MODE" is selected, the reproduction mode of BGM can be set as "monophonic" or "stereo". When "BGM VOLUME" or "SE VOLUME" is selected, a reproduction volume of BGM or sound effect can be settled. When "CONTROLLER 1P" or "CONTROLLER 2P" is selected, setting can be made as to whether the general-purpose controller 52A or dedicated controller 52B is used as 1 piece-use or 2 piece-use controller 52. When "VIBRATION" is selected, only in the case where the controller 52 contains a vibrator, modes of vibration by means of the vibrator can be selected. As the vibrating modes, "BEAT SYNC" for vibrating the controller 52A according to the rhythm of BGM, "BUTTON" for vibrating in response to operation of the controller 52, "MISS" for vibrating the controller 52 when the operation by the player is judged as a miss operation which does not attain a predetermined allowable range, and "NO USE" for forbidding the vibration are prepared.

When "BUTTON MODE" is selected, a 5-button mode (second mode) for limiting a number of operation buttons to be used in the game to five or a 9-button mode (first mode) where all nine operation buttons are used can be selected. When 5-button mode is selected, operations, which corresponds to the two tracks 102a, 102b which are positioned on one edge of the gauge 101 and the two 102h and 102i which are positioned on the other edge of the gauge 101, are not required. As a result, the difficulty of the game is lowered, and thus comfortable playing environment can be provided to the player who is not used to the game. Here, as modes where a number of operation buttons is decreased, instead of the 5-button mode, a 7-button mode or the like, where operations corresponding to the tracks 102a and 102i on both the edges of the gauge 101 are not required and a number of operation buttons is limited to seven, may be provided. All the setting items in the option process are recorded as playing conditions onto the main memory 13. Moreover, the setting items are also saved in the memory card 53 according to the instruction by the player. Here, When a predetermined initializing operation is performed for the game system 1, the first mode is selected in default setting.

Figure 12:
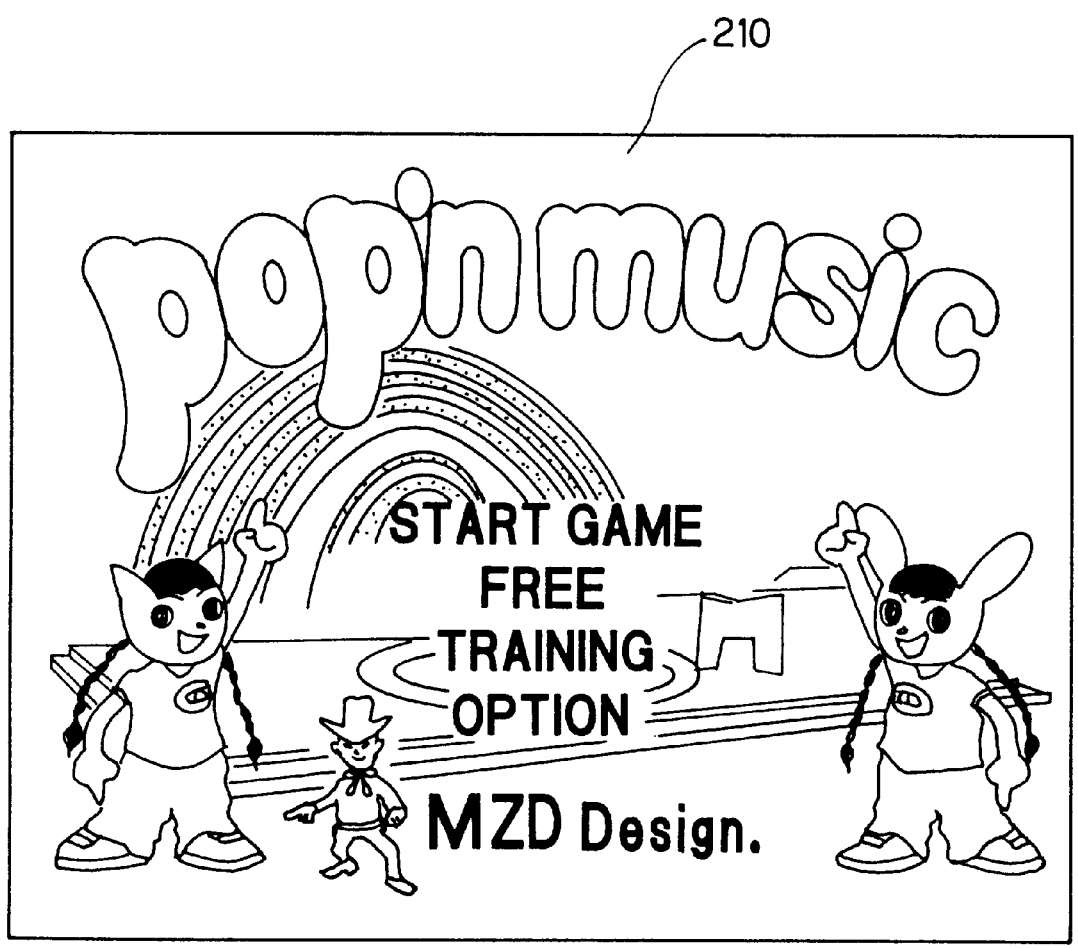
FIG. 12 is a diagram showing a mode selection screen displayed in the process of FIG. 10.

When one of the steps S6 through S9 of FIG. 10 is ended, the CPU 11 returns the process to step S4 of FIG. 10, and displays the screen 210 of FIG. 12 on the monitor 25 and waits for the next process by the player.

Figure 15:
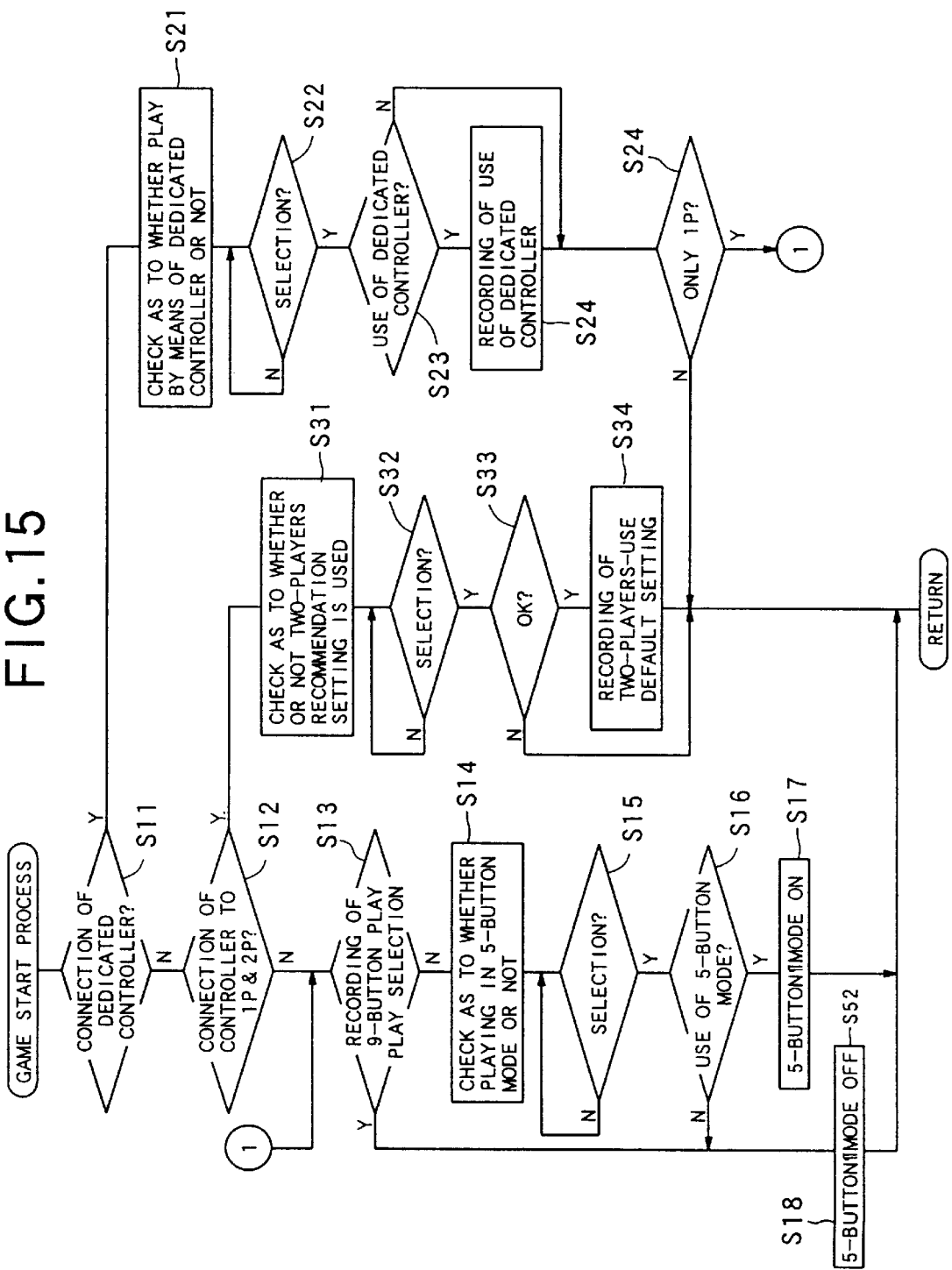
FIG. 15 is a flow chart of the game start process executed as a sub routine of the game process of FIG. 10.
Figure 16:
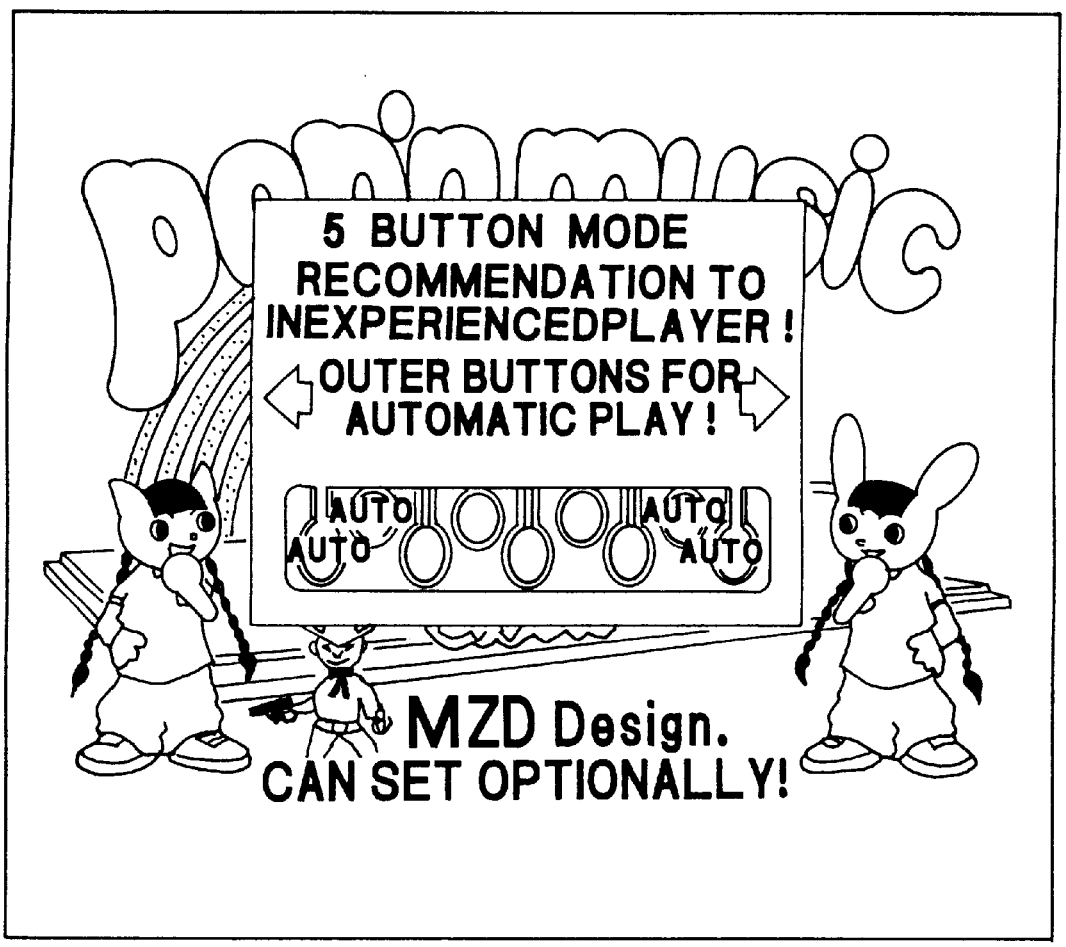
FIG. 16 is a diagram showing a screen displayed when use of 5 button mode is confirmed in the process of FIG. 15.

FIG. 15 is the flow chart showing details of the game start process executed at step S3 of FIG. 10. This process is provided in order that the player who is not used to the game can set suitable playing environment. The CPU 11 starts the game start process to read a signal from the communication control device 51 and judges as to whether or not the dedicated controller 52B is connected (step S11). When the dedicated controller 52B is not connected, the CPU 11 judges as to whether or not the general-purpose controller 52A is connected with the 1P side and 2P side of the communication control device 51. Any method of confirming the connection of the dedicated controller 52B can be applied, and thus, for example, a special circuit is provided on the side of the dedicated controller 52B and when a request signal is transmitted from the CPU 11, a specified signal is retransmitted from the dedicated controller 52B. When the judgment is made as NO, namely, when the controller 52 is connected only with the 1P side, the sequence goes to step S13, and a judgment is made as to whether or not the history of playing in the 9-button mode is recorded in the memory card 53. If the history is not recorded (including the case that data cannot be read), the screen 300 of FIG. 16 is displayed on the monitor 25 and a confirmation is made as to whether or not the player wants to play in the 5-button mode (step S14) and the sequence waits for selection by the player (step S15). When the player operates the controller 52 to select, a judgment is made as to whether or not the 5-button mode is selected (step S16). When the 5-button mode is selected, the playing in the 5-button mode is turned ON (step S17), and when not, the playing in the 5-button mode is turned OFF (step S18). Thereafter, the sequence returns to the process of FIG. 10. Here, in the case where the 5-button mode and 9-button mode as well as the 7-button mode can be selected in the option setting process (step S9) of FIG. 10, the player selects one of the modes at step S16, and the mode according to the selected result may be turned ON.

Figure 17:
FIG. 17 is a diagram showing a screen displayed when use of a dedicated controller is confirmed in the process of FIG. 15.

When the judgment is made at step S11 that the dedicated controller 52B is connected, a screen 310 of FIG. 17 is displayed so that the player is confirmed as to whether or not the player plays by means of the dedicated controller (step S21), and the sequence waits for selection by the player (step S22). When the player operates the controller 52 to select, a judgment is made as to whether or not the use of the dedicated controller is selected (step S23). The judgment is made as YES at S23, it is recorded as information relating to the controller into the main memory 13 that the dedicated controller 52B is used on the side (1P or 2P) with which the dedicated controller 52B is connected (step S24). This recording process is equivalent to the process executed in the case where the dedicated controller 52B is selected in "CONTROLLER 1P" or "CONTROLLER 2P" on the screen 230 of FIG. 14.

After the use of the dedicated controller 52B is recorded at step S24, or when the judgment is made as NO at step S23, the sequence goes to step S25, and a judgment is made as to whether or not the controller 52 is connected only with the 1P side of the communication control device 51. When the controller 52 is connected only with the 1P side, the sequence goes to step S13, and when not, the game start process is ended and the sequence returns to the process of FIG. 1.

Figure 18:
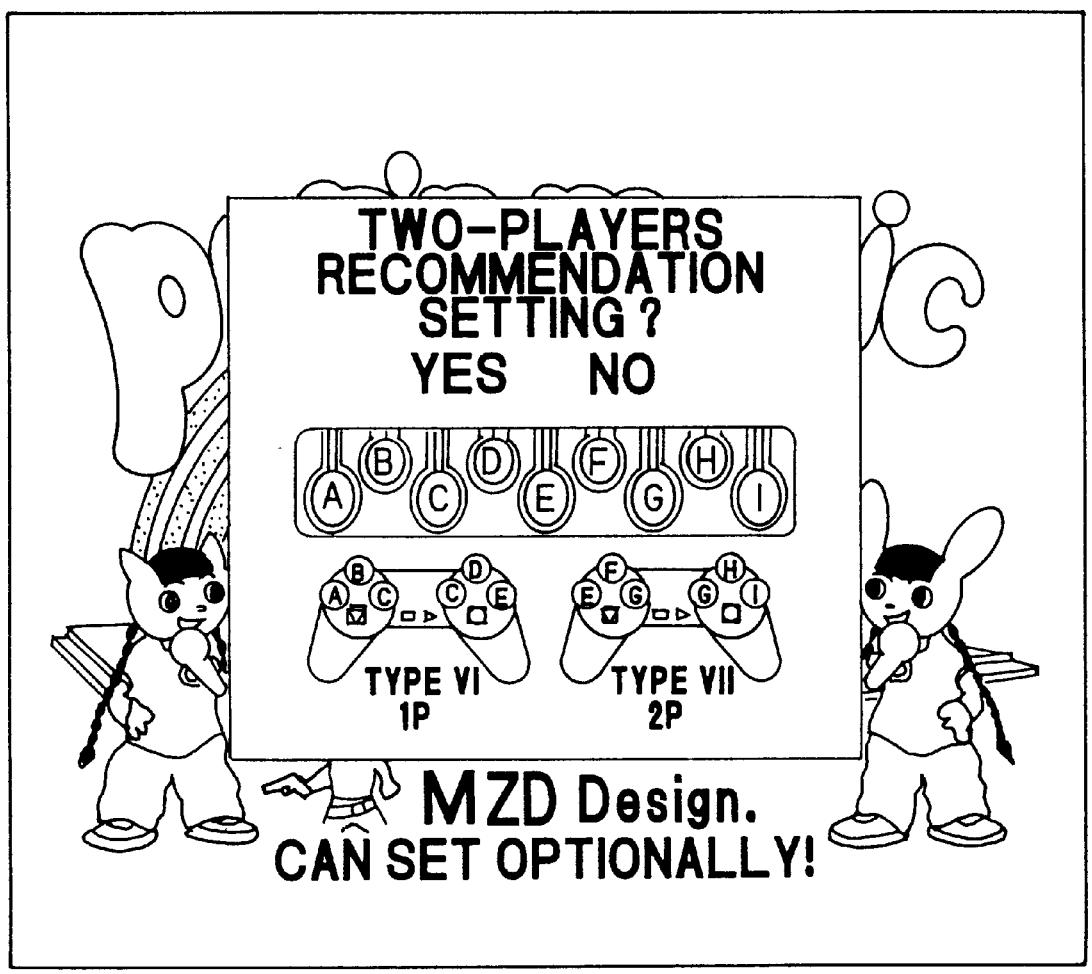
FIG. 18 is a diagram showing a screen displayed when use of "two-player recommendation setting" is confirmed in the process of FIG. 15.

The judgment is made at step S12 that the general-purpose controller 52A is connected with both the 1P and 2P sides, the screen 320 of FIG. 18 is displayed on the monitor 25, and the confirmation is made to the player as to whether or not the player will select "recommended setting for two players" in the corresponding relationship between the pushbutton switches PB1 through PB12 on the general-purpose controller 52A and the operation buttons A through I in the game (step S31), and the sequence waits for the selection by the player (step S32). When the player operates the controller 52 to select, a judgment is made as to whether or not the use of "recommended setting for two players" is accepted (step S33). When it is accepted, the corresponding relationship between the pushbutton switches PB1 through PB12 on the general-purpose controller 52A of 1P and 2P and the operation buttons A through I in the game is set to a state previously determined as the default setting for two players (step S34). After step S34, or when the judgment is made as NO at step S33, the game start process is ended, and the sequence returns to the process of FIG. 10.

Figure 19:
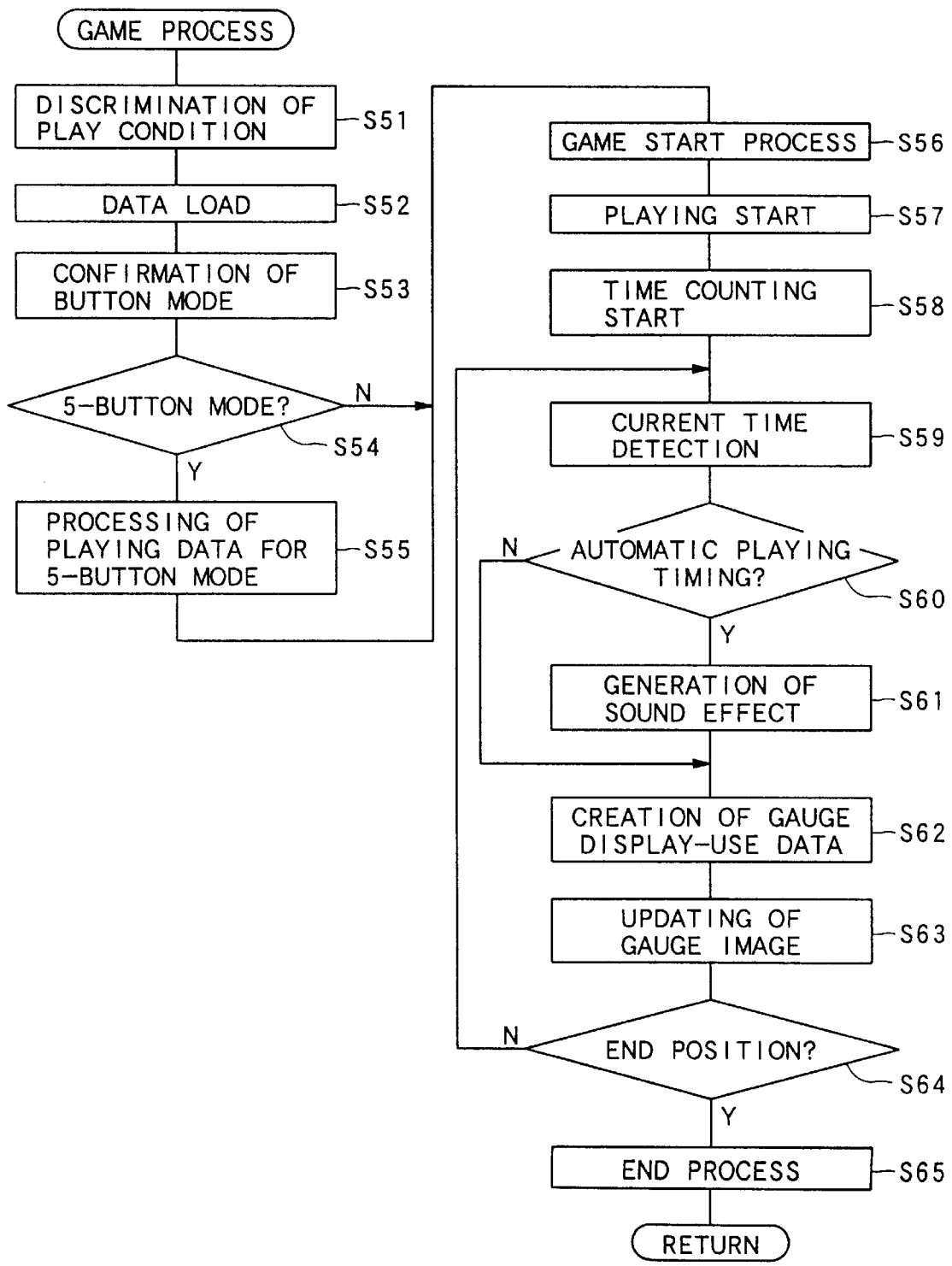
FIG. 19 is a flow chart of the game process executed when one piece of BGM is played in the case where a game mode or a free mode is selected in the process of FIG. 10.

FIG. 19 is a flow chart showing the sequence of the game process executed by the CPU 11 according to one piece of BGM in the case where the game mode or free mode is selected in FIG. 10. In the case where the playing of one piece of BGM is started, the CPU 11 reads play conditions recorded in the main memory 13 to judge their contents (step S51), and loads data required for the playing (for example, operation timing data or the like) from the CD-ROM 44 into the main memory 13 (step S52). Thereafter, the current button mode is confirmed (step S53), and a judgment is made as to whether or not the 5-button mode is turned ON (step S54). When ON, a process, which is required for treating the operation timing data relating to the operation buttons A, B, H and I as the automatic playing data, is executed (step S55). For example, operation timing which is defined by the operation timing data is added to the automatic playing timing of the automatic playing data previously created for the operation buttons A, B, H and I.

Thereafter, a process required for starting the game such as display of guidance for starting the game is executed (step S56), and an instruction is given so that the waveform data of BGM are transmitted from the disk reading section 40 to the sound control section 30, and reproduction of the waveform data is started (step S57). Then, time count for specifying elapsed time from the starting of the playing is started (step S58).

Current time is detected at step S59, and the a judgment is made as to whether or not the time corresponds to automatic playing timing relating to one of the operation buttons A through I (step S60). When the time is the automatic playing timing, a sound effect corresponding to one of the operation button A through I is generated (step S61). At this time, if the 5-button mode is turned ON, the sound effect, which is not originally generated unless the operation button A, B H or I is operated, is automatically generated by the process of step S55.

Figure 22:
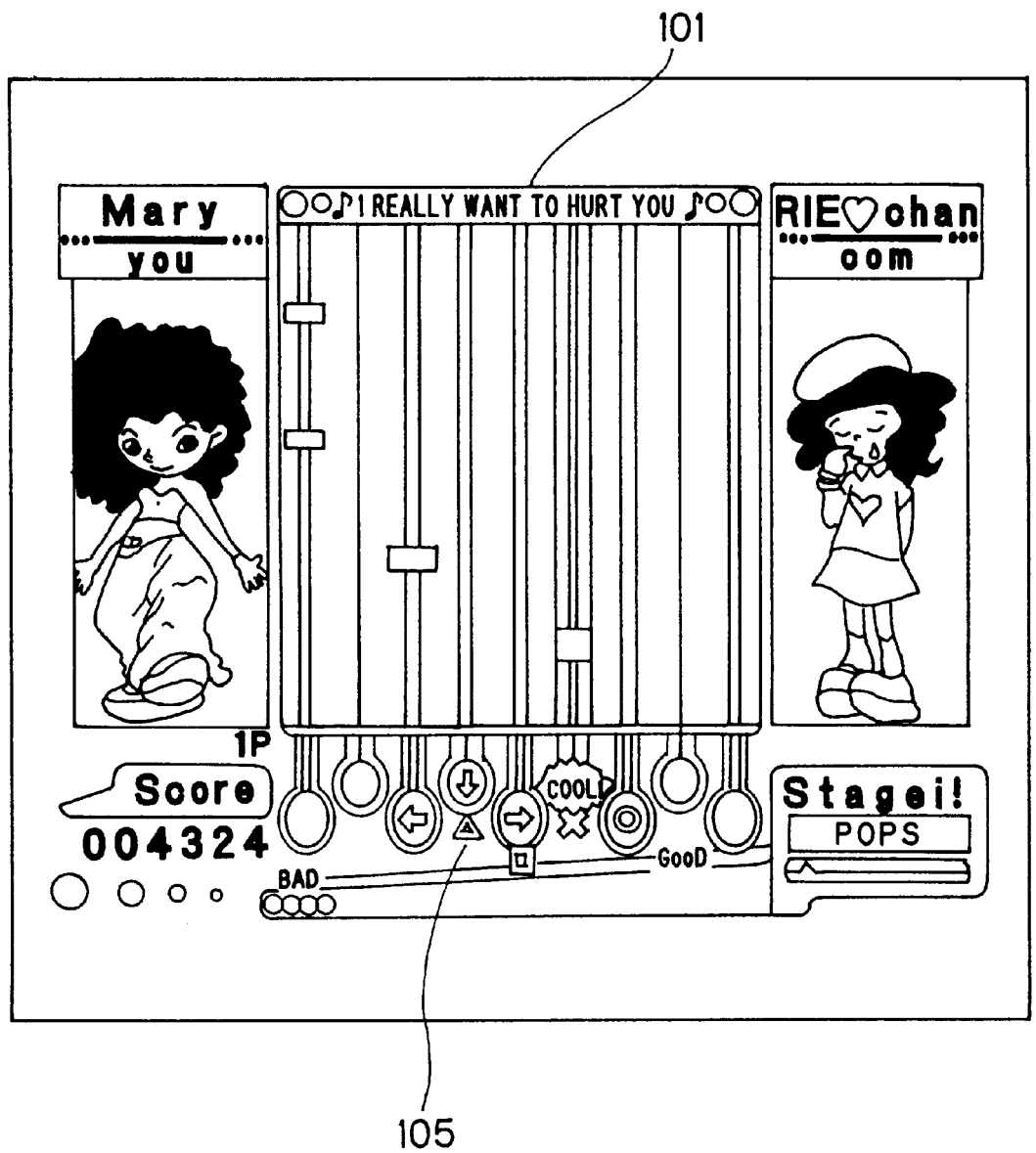

After the process of step S61, or if the judgement is made at step S60 that it is not for automatic playing timing, the data (coordinates of the timing marks 103, for example) for displaying the gauge 101 corresponding to the current time on the monitor 25 are created based on the operation timing data (step S62), and the display of the gauge 101 is updated based on the created data (step S63). Here, when the 5-button mode is turned ON, a process for lowering lightness of the tracks 102a, 102b, 102h and 102i corresponding to the operation buttons A, B, H and I is added as shown in FIG. 22, and the player is informed that the operation of the pushbutton switches corresponding to these tracks is not required. However, the timing marks 103 of the tracks 102a, 102b, 102h and 102i are displayed based on the operation timing data.

After the display of the gauge 101 is updated, a judgment is made at step S64 based on the current time as to whether or not the playing reaches the playing end position of BGM, and if the playing does not reach the end position, the sequence returns to step S59. When the playing reaches the practice end position, a predetermined process is executed (step S65), and the process on one piece of music is ended.

Figure 20:
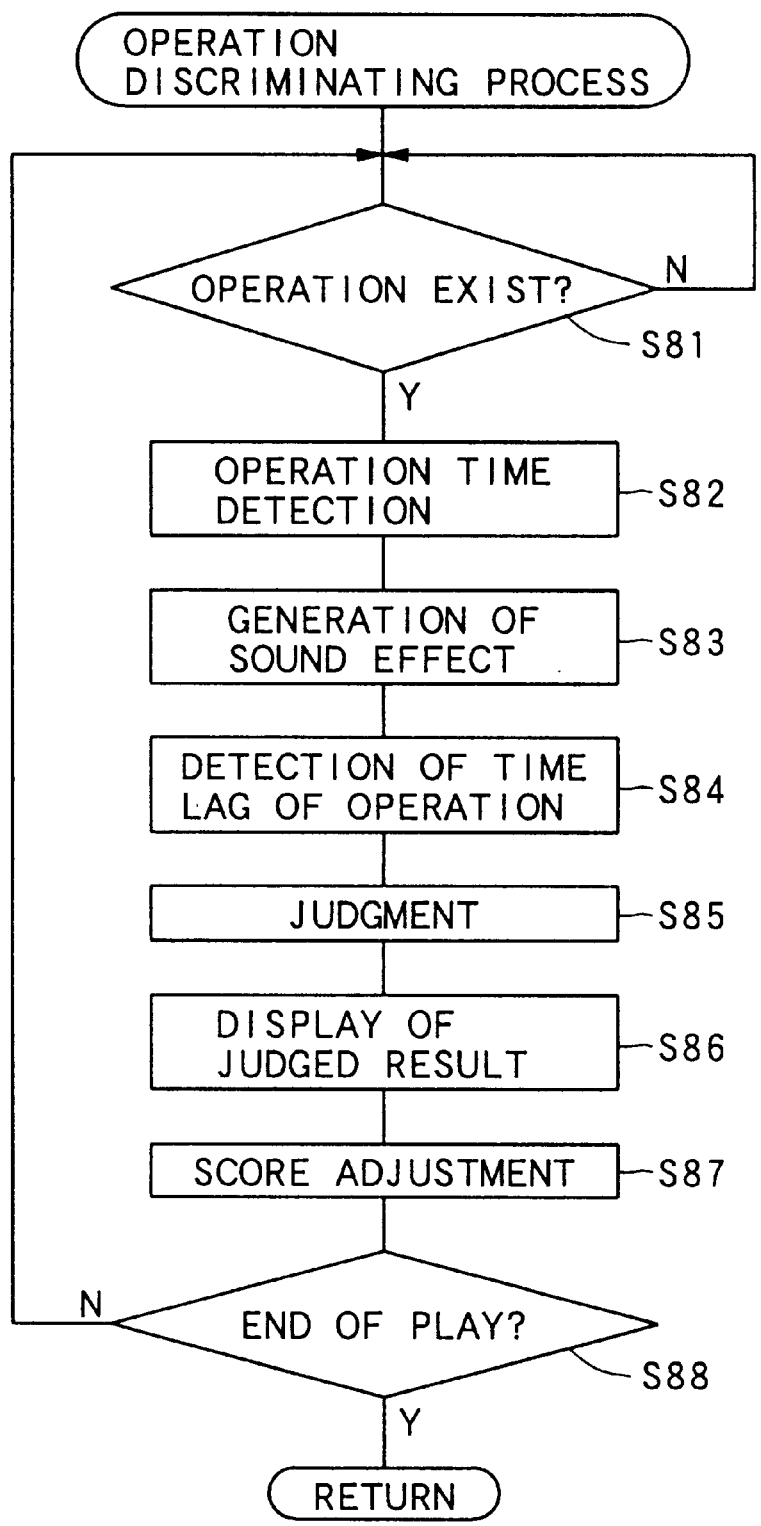
FIG. 20 is a flow chart showing a procedure of an operation judging process executed by a CPU at the same time while BGM is reproduced in the process of FIG. 19.

FIG. 20 is a flow chart showing an operation judging process executed by the CPU 11 simultaneously while the steps S59 through S64 are being repeated in the process of FIG. 19. In this process, a judgment is first made as to whether or not the player operates one of the operation buttons A through I (step S81), when the operation is performed, its operated time is detected (step S82). Successively, the sound effect which is allocated for the operated button is generated from the speaker 33 (step S83).

A detection is made at next step S84 as to time lag between the operated time detected at step S82 and operation timing which is the closest to the current time of the operation timing specified based on the operation timing data (however, it is limited to operation timing relating to the actually operated operation button). A judgment is made based on the detected time lag as to the operation is good or bad in several grades (step S85). The track 102 corresponding to the button operated on the screen 100 is displayed, and characters, etc. corresponding to the judged result are displayed on the judgment display section 105 at step S86 (see FIGS. 4 and 22).

At the next step S87, a score from the starting of the playing to the present is counted according to the judged result of step S85. For example, a standard position is provided in the judged result, and when the judged result is better than the standard position, a score is added up, and when the judgment result is worse than the standard point, the score is deducted. In such a manner, judgment is made so that the better each operation is, the higher score the player gets. A judgment is made at step S88 as to whether or not the playing is ended, and when the judgment is made that the playing is not ended, the sequence returns to step S81, and when the judgment is made that the playing is ended, the operation judging process is ended. In FIGS. 19 and 20, the automatic playing data are created correspondingly to the 5-button mode, but in another way, the judging routine of FIG. 20 is changed so as to cope with the 5-button mode. Namely, as for the operation timing data for the operation buttons A, B, H and I, the judgments at steps S81 and S82 are omitted and a process is executed in the case that these buttons are operated at the best operation timing, and thus the processes after step S83 may be executed.

Figure 21:
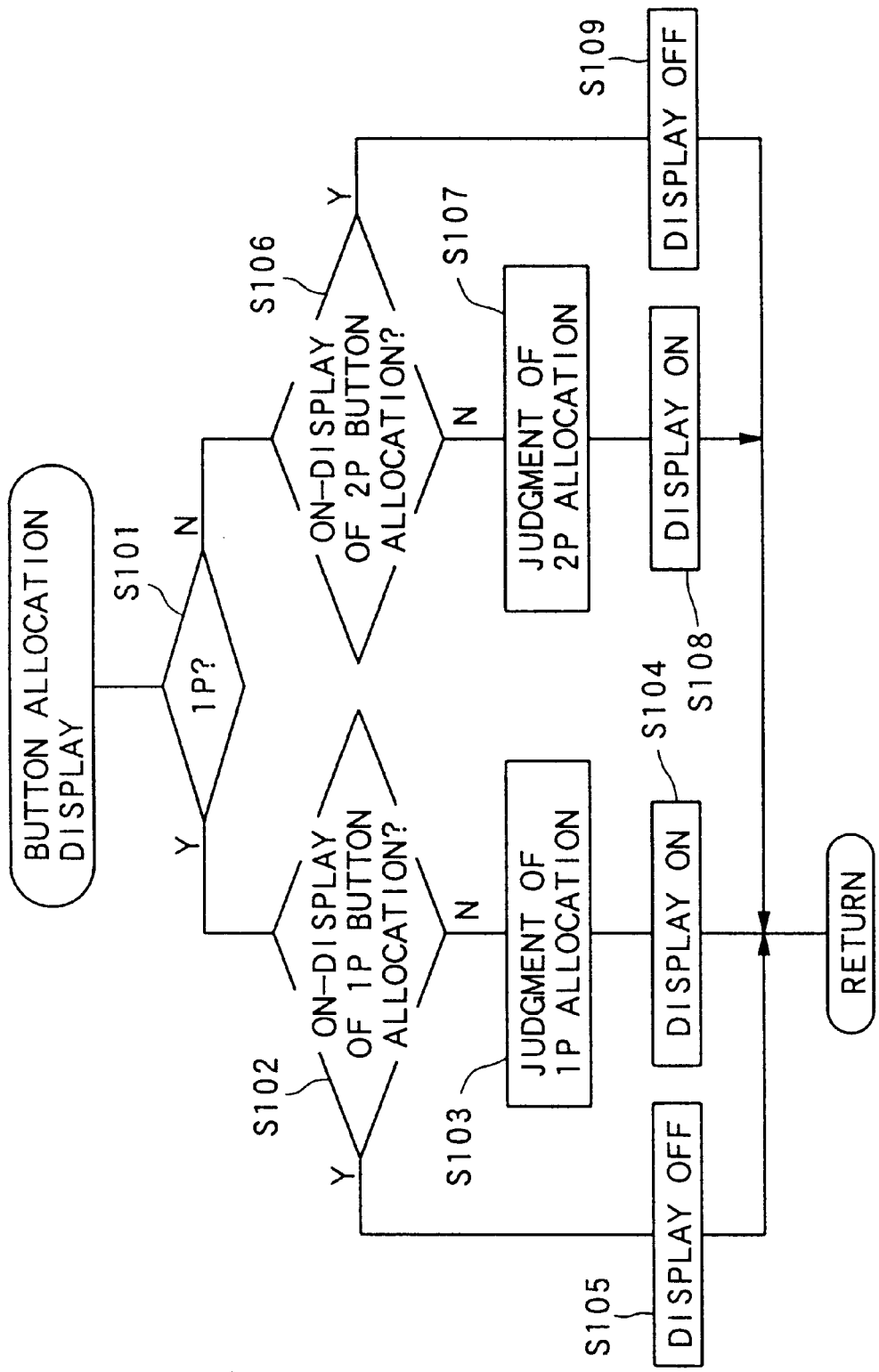
FIG. 21 is a flow chart for button allocation display process executed interruptively when a player operates a select button of the controller while the process of FIG. 19 is being executed.
Figure 23:
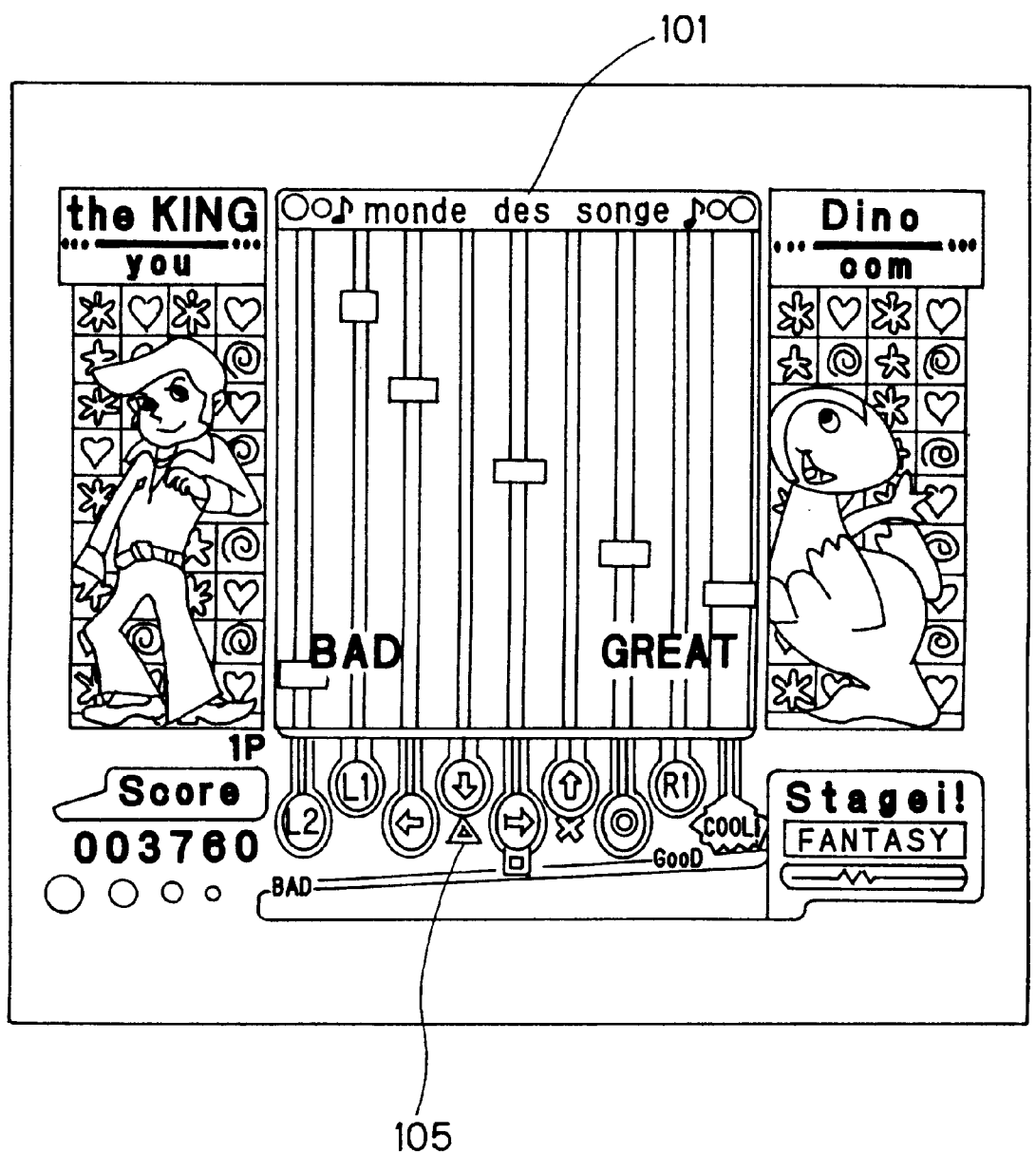
FIG. 23 is a diagram showing one example of the game screen when the process of FIG. 19 is executed in a sate that the 5 button mode is OFF.

In addition, when the player pushes down the select button during the playing on the general-purpose controller 52A, the CPU 11 interruptively executes the process of FIG. 21. As shown in FIGS. 22 and 23, this process is for switching between display or non-display of information for discriminating the allocation of the pushbutton switches PB1 through PB12 to the tracks 102a through 102i on the judgment display section 105 below the gauge 101. Here, the examples of the screens in FIGS. 22 and 23, the operation buttons PB1 through PB4 are represented by right, left, up and down arrows, the operation button PB5 through PB8 are represented by symbols Δ, ×, □, and ○, and the operation buttons PB9 through PB12 are represented by L1, L2, R1 and R2. FIG. 22 shows the example of the playing in the 5-button mode, and FIG. 23 shows the example of the playing in the 9-button mode. However, in both the examples, the controller 52A is connected only with the 1P side.

When the process of FIG. 21 is started, the CPU 11 first judges at step S101 as to whether or not a select button of the controller 52 on the 1P side is pushed down. When the judgment is made as 1P side, the sequence goes to step S102, and a judgment is made as to whether or not the allocation of the operations buttons on the controller 52A in the 1P side is displayed currently. When it is not displayed, allocation of the operation buttons A through I in the game to the operation buttons PB1 through PB12 is discriminated according to the playing conditions recorded in the main memory 13 (step S103). Information for discriminating the allocation of the pushbutton switches PB1 through PB12 is displayed on the judgment display section based on the judged result (step S104). Meanwhile, when the judgment is made at step S102 that the allocation of the operation buttons is being displayed currently, the display is stopped at step S105.

When the judgment is made at step S101 that the operation on the 1P side is not performed, the steps same as the above relating to the pushbutton switches PB1 through PB12 of the controller 52A in the 2P side are executed (step S106 through S109). After the step S104, S105, S108 or S109 is executed, the interruption process is ended.

In the above embodiment, when step S3 is executed just after the main routine of FIG. 10 is started, and when "CONTROLLER 1P" or "CONTROLLER 2P" is selected in the option setting process at step S9, the selection can be made as to use of the general-purpose controller 52A or dedicated controller 52B as the controller 52. Therefore, after the main routine is once started and step S3 is executed, the game system cannot be made to recognize the switching between the general-purpose controller 52A and dedicated controller 52B as long as the option setting process or the game initializing operation is not executed. However, the switching can be occasionally made between the general-purpose controller 52A and dedicated controller 52B in the communication control device 51 even while the game is being played.

Figure 24:
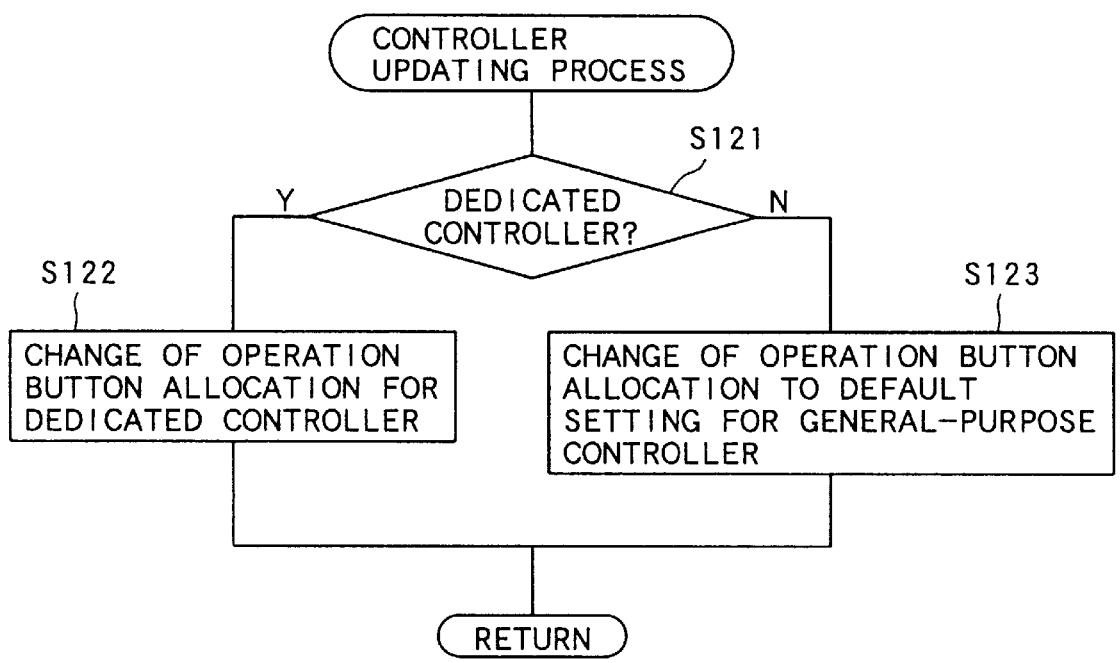
FIG. 24 is a flow chart of a controller updating process executed when connection of the controller is switched during the game.

In order to automatically change the registration of the controller 52 in such a case, a change in a judgment signal outputted from the dedicated controller 52B is periodically monitored by the CPU 11, and when the signal is changed, namely, when a new judgment signal is detected, or when the judgment signal which has been detected is cut off, a judgment is made that the controller 52 is changed and the process of FIG. 24 may be executed. In this process, a judgment is made at step S121 as to whether or not the dedicated controller 52B is newly connected, and when the judgment is made that the dedicated controller 52B is connected, the allocation of the operation buttons A through I to the controller 52 is updated to setting for the dedicated controller (step S122). Meanwhile, when the judgment is made at step S121 that the general-purpose controller 52A is connected, the allocation of the operation buttons A through I to the controller 52 is changed into the default setting for the general-purpose controller (step S123). The default setting is made as shown in FIG. 5, for example. In another way, the setting before the storage may be returned at step S123. Here, in the case where the setting of the controller can be automatically switched as mentioned above, the setting items of the controller may be omitted in the option setting process.

Figure 25:
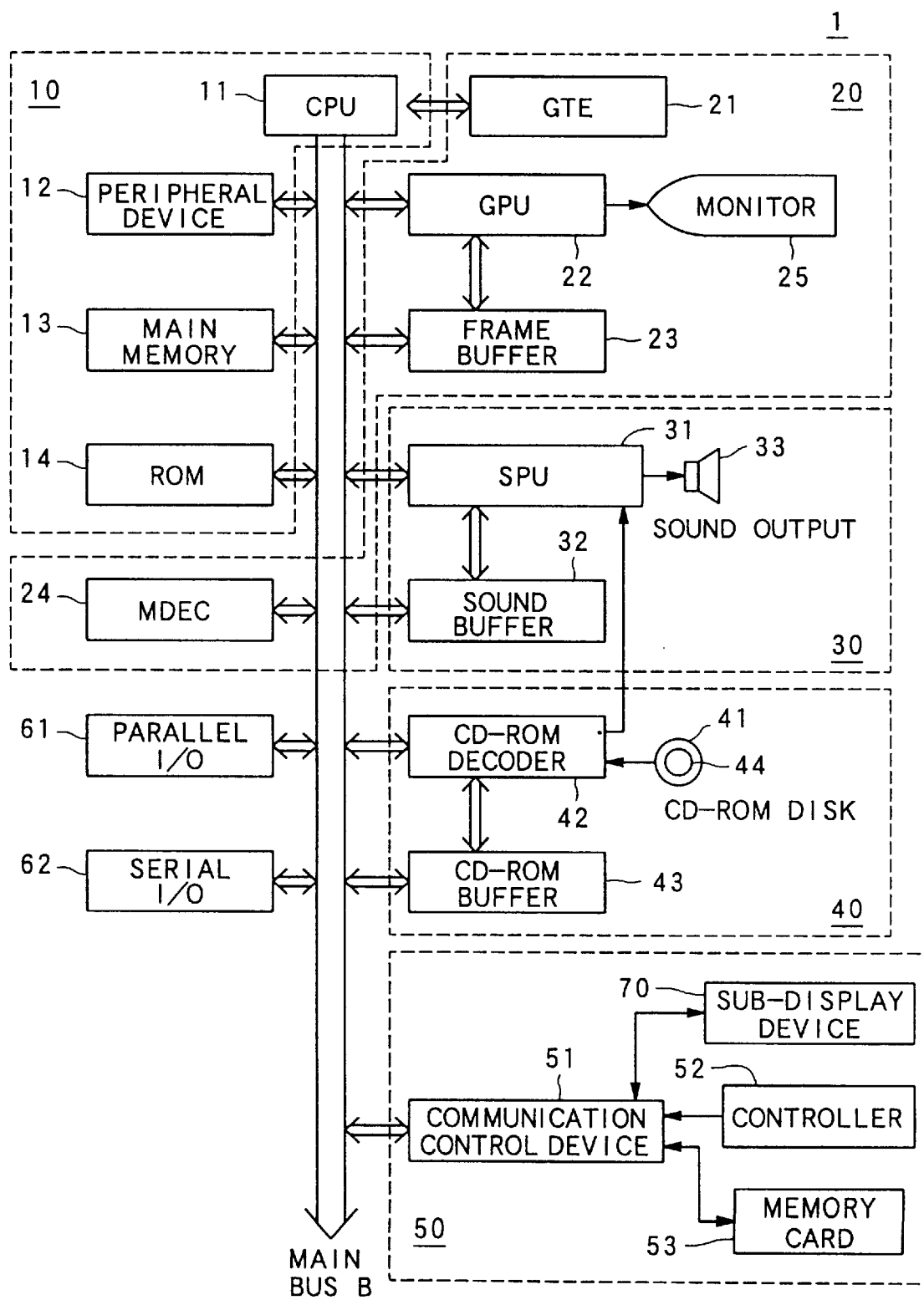
FIG. 25 is a diagram showing an example that a sub-display device is added to a communication control section in the block diagram of FIG. 1.
Figure 26A:
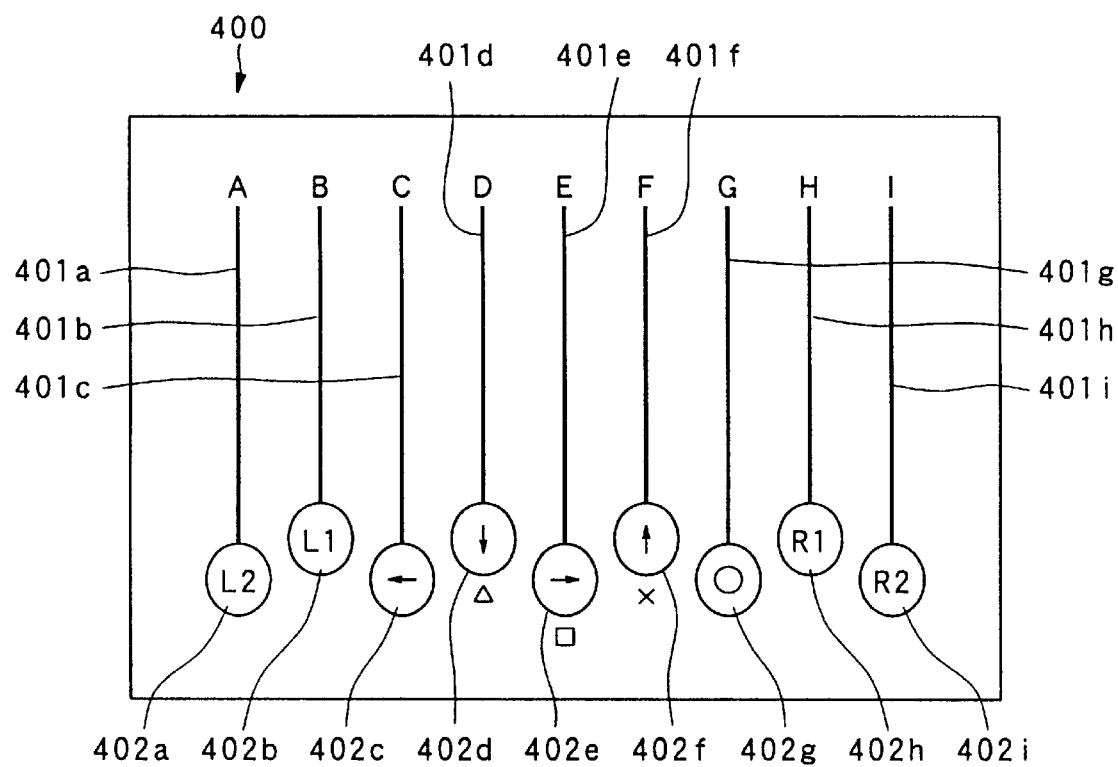
FIG. 26 is a diagram showing one example of an image displayed on a screen of the sub-display device of FIG. 25.
Figure 26B:
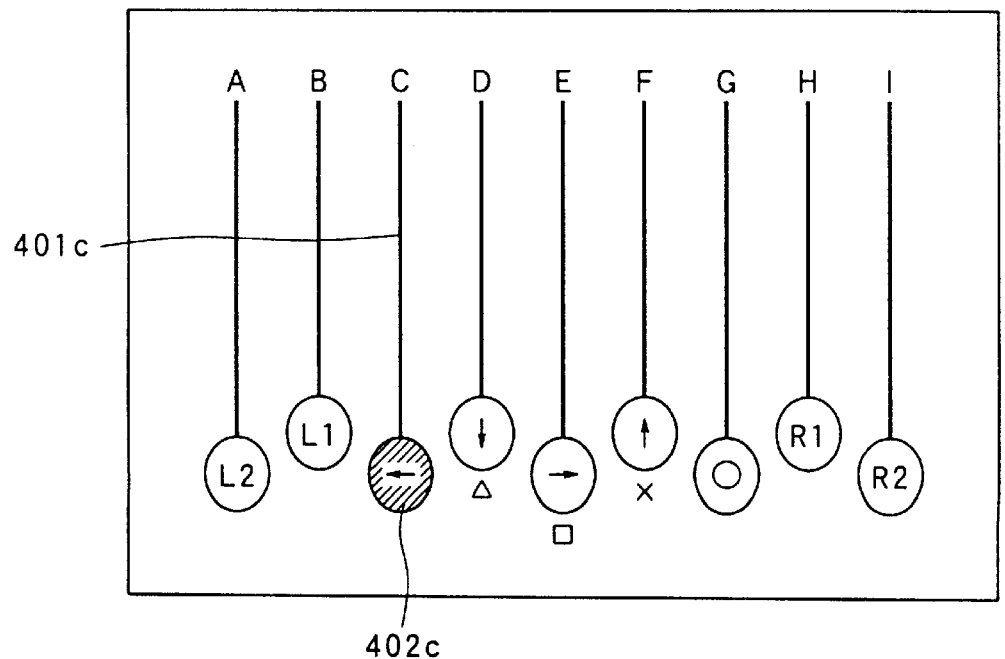

FIG. 25 shows an example that a sub-display device 70 is added to the communication control section 50. The sub-display device 70 comprises, for example, LCD (liquid crystal display device) and a driving circuit for controlling display of the LCD, and it is mounted onto the general-purpose controller 52A, for example. A screen 400 of FIG. 26(a), for example, is displayed on the sub-display device 70 according to the control of the CPU 11. Nine lines 401a through 401i representing the tracks 102a through 102i of the gauge 101, and oval allocation display section 402a through 402i representing the judgment display section 105 are provided on the screen 400. Images such as symbols, characters and numbers showing the pushbutton switches PB1 through PB12 on the general-purpose controller 52A corresponding to the tracks 102a through 102i are displayed in or in the vicinity of the allocation display sections 402a through 402i. As a result, the corresponding relationship between the tracks 102a through 102i and the pushbutton switches PB1 through PB12 can be confirmed on the controller 52A. More preferably, when the pushbutton switches PB1 through PB12 are operated, the display of the allocation display sections 402a through 402i corresponding to the pushbutton switches PB1 through PB12 is changed. FIG. 26(b) shows a state that gradation of the allocation display section 402c corresponding to the operation of the pushbutton switch PB3 (see FIG. 2) is switched. In the case where a plurality of the general-purpose controllers 52A are connected, since the dedicated sub-display device 70 is provided for each of the controllers 52A, the allocation state of the operation buttons A through I on each of the controllers 52A can be displayed on each of the sub-display device 70.

The above embodiment described the case where the present invention is applied to the game which is constituted on condition that the nine operation buttons are used, but needless to say the present invention can be applied to other game systems. For example, a number of the operation buttons is not limited to nine, and thus an arbitrary number of operation buttons may be used. In addition to the operation buttons, a table or the like which can be rotated may be provided as the operation member.

In the above embodiment, according to the combination with software, the CPU 11 serves as operation instructing means, mode selecting means, operation instruction limiting means, evaluating means, evaluation informing means, music reproduction instructing means, sound effect output instructing means, sound effect automatic output instructing means, mode confirmation means confirmation control means, allocation information showing means, information display selecting means, allocation information display control means, allocation changing means and data updating means. However, some of these means may be replaced by a logic circuit utilizing LSI, etc.

As described above, according to the present invention, since the player can make a selection from the game which is played by using all the predetermined number of sections to be operated to be used in the game and the game which is played by using a smaller number of sections to be operated according to an instruction from the player, operational environment which is suitable for levels of various players can be provided.

In addition, since information for specifying the relationship between a plurality of operation members provided on the input unit and the sections to be operated in the game is given to the player, even if a number of the section to be operated is large, the corresponding relationship between the instructions of the operations given via the display device and the operation members on the input unit can be grasped clearly, and thus the operational environment which is comfortable for the player can be provide.

What is claimed is:

1. A game system, comprising:
   a display device for displaying a game picture;
   an input unit having a plurality of operation members to be operated by a player for outputting a signal corresponding to an operation state of the operation members;
   a storage device for storing operation timing data which specifies operation timing in a game relating to a predetermined number of operated sections allocated to at least some of said plurality of operation members; and
   a game control unit for checking the output signal from said input unit and the data recorded in said storage device, and simultaneously executing the game according to a predetermined procedure on a screen of said display device, wherein said game control unit comprises:
   an operation instructing device for displaying on the screen of the displaying device during the game, an instruction image for instructing the player to operate each of the predetermined number of operated sections at timing defined by the operation timing data;
   a mode selecting device for selecting a first mode for setting a number of said operated sections used in the game to said predetermined number, or a second mode for limiting the number of the operated sections to a limited number smaller than the predetermined number according to an instruction from the player;
   an operation instruction limiting device for changing the instruction image displayed through the operation instructing device so as to instruct the player to operate only said limited number of operated sections, during in the second mode; an evaluating device for evaluating the operation by the player on said input unit performed in response to the instruction from said operation instructing device based on the operation timing data; and
   an evaluation informing device for informing the player of information relating to the evaluated result by said evaluating device.

2. The game system according to claim 1, wherein:
   said operation instructing device displays a gauge which is dividable into parallel tracks corresponding to said predetermined number of operated sections and has indexes for showing the operation timing of the operated sections correspondingly to each of the tracks, and gradually changes display positions of the indexes along the tracks according to the proceeding of the game so that when the operation timing of the operated sections corresponding to the tracks comes, the indexes reach predetermined positions of the gauge; and
   said operation instruction limiting device provides an image effect for making the player realize that the operations of the operated sections corresponding to some of the tracks of the parallel tracks are not required.

3. The game system according to claim 2, wherein said image effect is to lower lightness of a part of said tracks.

4. The game system according to claim 3, wherein a part of said tracks are positioned in ends of the gauge in a direction in which the tracks are arranged.

5. The game system according to claim 1, comprising a sound output device for outputting a predetermined sound, wherein said storage device stores music data and sound effect data for outputting predetermined music and sound effects corresponding to the operations of the operated sections from said sound output device, said game control unit comprises:
   a music reproduction instructing device for outputting the music based on the music data from said sound output device during the game;
   a sound effect output instructing device for outputting a predetermined sound effect based on the sound effect data from said sound output device in response to operations of operation members allocated as the operated sections; and a sound effect automatic output instructing device for outputting a sound effect according to the operation from said sound output device based on the sound effect data when the game is executed in the second mode, where an indication is made by said operation indication device in the first mode and the operated sections of which operations are not indicated are regarded as being operated with a timing specified by said operation timing data in the second mode.

6. The game system according to claim 1, wherein said mode selecting device comprises a mode confirming device for after a predetermined initializing operation is performed on the game system, inquiring of the player as to which of the first or the second mode is selected before the game is first executed, and one of the modes is selected based on an instruction of the player in response to the inquiry via said mode confirming device.

7. The game system according to claim 6, wherein:

a plurality of said input units can be connected with said game control unit; and said mode selecting device comprises a confirmation control device for judging as to whether or not said plurality of input units are connected, and when the judgment is made that one input unit is connected, allowing the inquiry about the mode selection by said mode confirming device, and when the judgment is made that a plurality of the input units are connected, forbidding the inquiry.

8. The game system according to claim 6, further comprising an auxiliary storage device in which information about a play history of the player can be recorded, said auxiliary storage device being capable of being connected with said game control unit, wherein said mode selecting device comprises a confirmation control device for after the initializing operation is performed, judging as to whether or not information representing the history of the playing in the first mode is recorded in said auxiliary storage device before the game is first executed, and when the judgment is made that the play history in the first mode does not exist, allowing the inquiry about the mode selection by said mode confirming device, and when the judgment is made that a plurality of the play histories exists, forbidding the inquiry.

9. A game system, comprising:

a display device for displaying a game picture;

an input unit having a plurality of operation members to be operated by a player for outputting a signal corresponding to an operation state of the operation members;

a storage device for storing allocation data which defines a corresponding relationship between said plurality of operation members and a predetermined number of operated sections used in a game, and operation timing data which specifies operation timing in the game relating to the operated sections; and a game control unit for checking the output signal from said input unit and the data recorded in said storage device, and simultaneously executing the game according to a predetermined procedure on a screen of said display device, wherein said game control unit comprises:

an operation instructing device for displaying on the screen of the displaying device during the game, an instruction image for instructing the player to operate each of the predetermined number of operated sections at timing defined by the operation timing data;

an evaluating device for evaluating the operation of said input unit by the player performed in response to the instruction from the operation instructing device based on the data defining said operation timing data;

an evaluation informing device for informing the player of information relating to the evaluated result by said evaluating device; and an allocation information presenting device for presenting information for specifying the relationship between said plurality of operation members and the operated sections to the player based on the allocation data, wherein:

said operation instructing device displays a gauge, which is dividable into parallel tracks corresponding to said predetermined number of operated sections and has indexes for showing the operation timing of the operated sections correspondingly to the tracks, as an image for instructing the operation of said predetermined number of operated sections, and gradually changes display positions of the indexes along the tracks according to the proceeding of the game so that when the operation timing of the operated sections corresponding to the tracks comes, the indexes reach predetermined positions of the gauge; and said allocation information presenting device displays the information for specifying the relationship between said plurality of operation members and the operated sections in a vicinity of the predetermined position of the gauge.

10. The game system according to claim 9, wherein marks for distinguishing said plurality of operation members from each other are displayed on said display unit, and said allocation information presenting device displays an image imitating the marks as the information.

11. The game system according to claim 9, wherein said allocation information presenting device displays the information on the screen of said display device.

12. The game system according to claim 9, wherein a sub-display device which is different from said display device is provided on said input unit, and said allocation information presenting device displays the information on the screen of said display device.

13. The game system according to claim 9, wherein:

a plurality of input devices can be connected with said game control unit, and a sub-display device which is different from said display device is provided for each of said plural input units; and said allocation information presenting device displays the information on the screen of said sub-display device.

14. The game system according to claim 9, wherein said game control unit comprises:

information display selecting device for making a selection according to an instruction from the player as to whether or not the information for specifying the relationship between said operation members is to be displayed; and an allocation information display control device for when display of the information is selected by said information display selecting device, allowing the display of the information by said allocation information presenting device, and when a pause of information display is selected, forbidding the display of the information by said allocation information presenting device.

15. The game system according to claim 9, wherein said game control unit comprises:

allocation changing device for changing the corresponding relationship between said plurality of operation members and a predetermined number of operated sections used in the game according to an instruction from the player; and data updating means for updating the allocation data recorded in said storage device according to the change in the allocation by means of said allocation changing means.

16. A storage medium readable by a computer, into which operation timing data which specify operation timing during a game relating to a predetermined number of operated sections allocated at least some of a plurality of operation members provided on an input unit of a game system, and a program for operating the computer provided in said game system as a game control unit f or executing the game according to a predetermined procedure while checking an output signal from said input unit and the operation timing data were recorded, said program operating said computer as:

an operation instructing device for displaying on the screen of the displaying device during the game, an instruction image for instructing the player to operate each of the predetermined number of operated sections at timing defined by the operation timing data;

a mode selecting device for selecting a first mode for setting a number of the operated sections used in the game to the predetermined number or a second mode for limiting the number to a limited number smaller than the predetermined number according to an instruction from a player;

an operation instruction limiting device f or changing the instruction image displayed through the operation instructing device so as to instruct the player to operate only said limited number of operated sections, during in the second mode;

an evaluating device for evaluating the operation of said input unit by the player in response to the instruction from said operation instructing device based on the operation timing data; and an evaluation informing device for informing the player of information relating to the evaluated result by said evaluating device.

17. A storage medium readable by a computer, into which allocation data which define a corresponding relationship between a plurality of operation members on an input unit provided in a game system and a predetermined number of operated sections used in a game, operation timing data which specify operation timing during the game relating to the operated sections, and a program for operating the computer provided in said game system as a game control unit for executing the game according to a predetermined procedure while checking an output signal from said input unit and the operation timing data were recorded, said program operating said computer as:

an operation instructing device for displaying on the screen of the displaying device during the game, an instruction image for instructing the player to operate each of the predetermined number of operated sections at timing defined by the operation timing data;

an evaluating means for evaluating the operation of said input unit by the player in response to the instruction from said operation instructing means based on the operation timing data;

an evaluation informing device for informing the player of information relating to the evaluated result by said evaluating device; and an allocation information presenting device for presenting information which specifies the relationship between the plural operation members and the operated sections to the player based on the allocation data, wherein:

said operation instructing device displays a gauge, which is dividable into parallel tracks corresponding to said predetermined number of operated sections and has indexes for showing the operation timing of the operated sections correspondingly to the tracks, as an image for instructing the operation of said predetermined number of operated sections, and gradually changes display positions of the indexes along the tracks according to the proceeding of the game so that when the operation timing of the operated sections corresponding to the tracks comes, the indexes reach predetermined positions of the gauge; and said allocation information presenting device displays the information for specifying the relationship between said plurality of operation members and the operated sections in a vicinity of the predetermined position of the gauge.

* * * * *